(12) United States Patent
Otomo et al.

(10) Patent No.: US 9,118,799 B2
(45) Date of Patent: Aug. 25, 2015

(54) READING APPARATUS AND COMPOSITE APPARATUS

(71) Applicant: Oki Data Corporation, Tokyo (JP)

(72) Inventors: Kohei Otomo, Tokyo (JP); Shiro Ino, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/189,276

(22) Filed: Feb. 25, 2014

(65) Prior Publication Data

US 2014/0240802 A1 Aug. 28, 2014

(30) Foreign Application Priority Data

Feb. 28, 2013 (JP) .................... 2013-038427

(51) Int. Cl.
*H04N 1/04* (2006.01)
*H04N 1/10* (2006.01)

(52) U.S. Cl.
CPC ............ *H04N 1/1013* (2013.01); *H04N 1/103* (2013.01); *H04N 1/1017* (2013.01); *H04N 1/1026* (2013.01); *H04N 2201/02495* (2013.01); *H04N 2201/046* (2013.01); *H04N 2201/0442* (2013.01); *H04N 2201/0446* (2013.01); *H04N 2201/0458* (2013.01)

(58) Field of Classification Search
CPC ............ H04N 1/0057; H04N 1/00588; H04N 1/00702; H04N 2201/0456; H04N 1/00559; H04N 2201/0428
USPC .......... 358/497, 474, 496, 483; 399/299, 367, 399/401, 405, 91
See application file for complete search history.

(56) References Cited

U.S. PATENT DOCUMENTS

| | | | |
|---|---|---|---|
| 5,012,354 A * | 4/1991 | Tsuchiya ...................... | 358/474 |
| 5,212,523 A | 5/1993 | Ogaiwara et al. | |
| 5,467,111 A | 11/1995 | Furukawa et al. | |
| 5,677,813 A | 10/1997 | Yoshida et al. | |
| 5,907,343 A * | 5/1999 | Takemura et al. ............ | 347/108 |
| 6,332,598 B1 | 12/2001 | Tsuji | |
| 6,424,435 B1 * | 7/2002 | Kao .............................. | 358/497 |
| 6,736,502 B2 * | 5/2004 | Deguchi ....................... | 347/108 |
| 6,871,949 B2 * | 3/2005 | Nakano et al. ................ | 347/104 |
| 6,932,457 B2 * | 8/2005 | Sato .............................. | 347/37 |
| 6,974,203 B2 * | 12/2005 | Ikeda et al. .................... | 347/37 |
| 7,164,512 B2 * | 1/2007 | Takei ............................ | 358/496 |
| 7,738,146 B2 * | 6/2010 | Osakabe et al. .............. | 358/497 |

(Continued)

FOREIGN PATENT DOCUMENTS

| DE | 20001154 U1 | 9/2000 |
|---|---|---|
| JP | S59-195868 U | 12/1984 |

(Continued)

*Primary Examiner* — Negussie Worku
(74) *Attorney, Agent, or Firm* — Panitch Schwarze Belisario & Nadel LLP

(57) ABSTRACT

A reading apparatus includes a reading unit and a movement-restriction unit that restricts a movement of the reading unit. The reading unit includes a reading portion for reading an image, a holding portion that holds the reading portion. The holding portion has a first surface. The reading unit further includes a sliding portion that moves in contact with the movement-restriction unit. The sliding portion has a second surface facing the first surface. A first region is provided between the first surface of the holding portion and the second surface of the sliding portion so as to form a predetermined gap.

19 Claims, 19 Drawing Sheets

(56) References Cited

U.S. PATENT DOCUMENTS

| | | | | |
|---|---|---|---|---|
| 7,804,625 | B2 * | 9/2010 | Osakabe | 358/474 |
| 7,872,779 | B2 * | 1/2011 | Nagatani | 358/474 |
| 8,218,204 | B2 * | 7/2012 | Hozono | 358/474 |
| 8,300,278 | B2 * | 10/2012 | Uchida et al. | 358/474 |
| 8,811,883 | B2 * | 8/2014 | Miyauchi | 399/405 |
| 8,848,208 | B2 * | 9/2014 | Sumioka | 358/1.13 |
| 8,928,958 | B2 * | 1/2015 | Yamasaki | 358/484 |
| 2002/0106217 | A1 | 8/2002 | Ando | |
| 2003/0006284 | A1 | 1/2003 | Kohchi et al. | |
| 2005/0122555 | A1 | 6/2005 | Kondoh et al. | |
| 2006/0119729 | A1 | 6/2006 | Qian | |
| 2008/0304114 | A1 | 12/2008 | Wu et al. | |

FOREIGN PATENT DOCUMENTS

| | | |
|---|---|---|
| JP | H07-208572 A | 8/1995 |
| JP | 2002-074884 A | 3/2002 |
| JP | 2007-274628 A | 10/2007 |
| JP | 2010-136051 A | 6/2010 |

\* cited by examiner

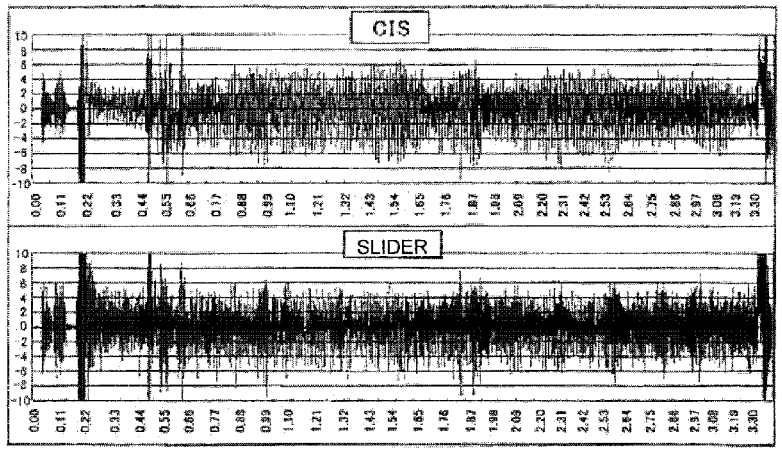
FIG. 14A
FIG. 14B
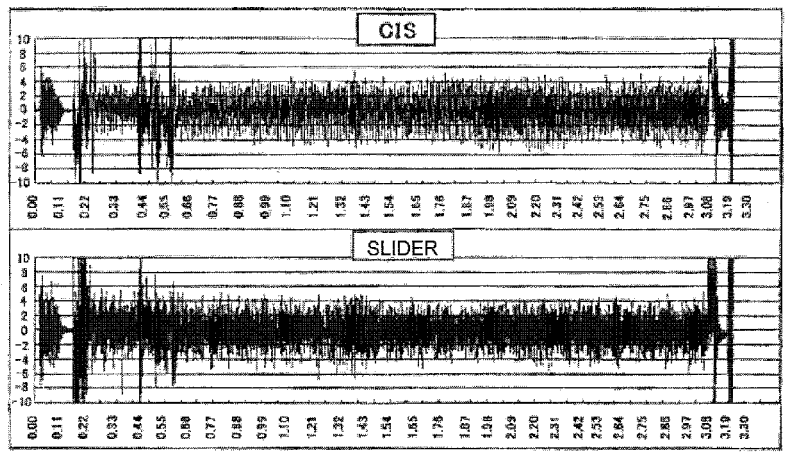
FIG. 15A
FIG. 15B

READING APPARATUS AND COMPOSITE APPARATUS

BACKGROUND OF THE INVENTION

The present invention relates to a reading apparatus that reads an image of a medium, and a composite apparatus including the reading apparatus.

There is known an apparatus such as a composite apparatus having a reading section for reading an image of a medium (i.e., a document). Such an apparatus is disclosed in, for example, Japanese Laid-open Patent Publication No. 2010-136051 (paragraphs 0038 to 0044).

In this regard, there is a demand for enhancing an accuracy of reading when vibration is applied to the reading section.

SUMMARY OF THE INVENTION

An aspect of the present invention is intended to provide a reading apparatus and a composite apparatus capable of enhancing an accuracy of reading when vibration is applied.

According to an aspect of the present invention, there is provided a reading apparatus including a reading unit, and a movement-restriction unit that restricts a movement of the reading unit. The reading unit includes a reading portion for reading an image, and a holding portion that holds the reading portion. The holding portion has a first surface. The reading unit further includes a sliding portion that moves in contact with the movement-restriction unit. The sliding portion has a second surface facing the first surface. The reading unit further includes a first region provided between the first surface of the holding portion and the second surface of the sliding portion so as to form a predetermined gap.

With such a configuration, it becomes possible to enhance an accuracy of reading when vibration is applied.

According to another aspect of the present invention, there is provided a composite apparatus including the above described reading apparatus.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIGS. 14A and 14B are graphs showing measurement results of vibrations of the CIS unit and the slider of the carriage unit of Comparison Example, FIGS. 15A and 15B are graphs showing measurement results of vibrations of the CIS unit and the slider of the carriage unit of the first embodiment.

DETAILED DESCRIPTION OF THE PREFERRED EMBODIMENT

Hereinafter, embodiments of the present invention will be described with reference to drawings. The present invention is not limited to the embodiments described below. The embodiments can be modified without departing the scope of the present invention.

FIRST EMBODIMENT

Entire Configuration of Composite Apparatus

Figure 1:
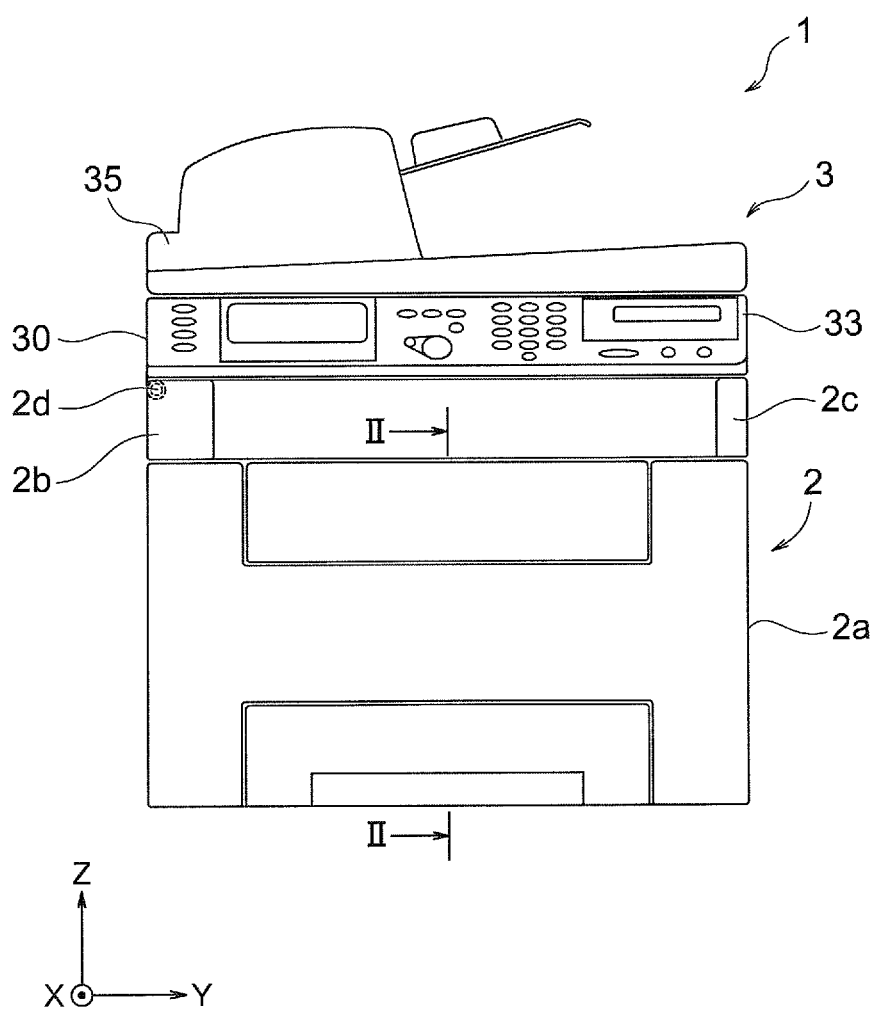
FIG. 1 is a front view showing a composite apparatus including a reading apparatus according to the first embodiment of the present invention.
Figure 2:
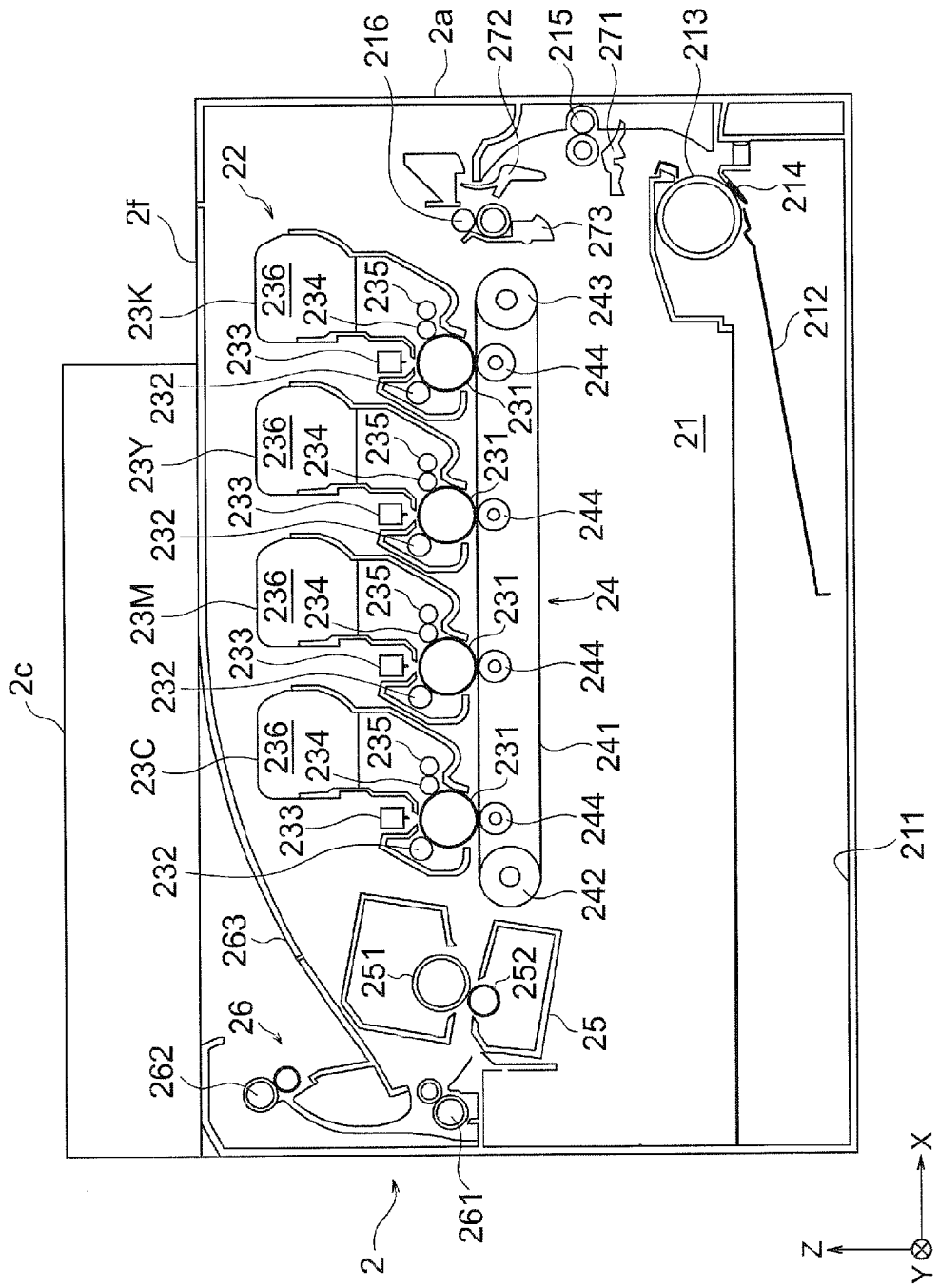
FIG. 2 is a sectional view of the composite apparatus according to the first embodiment taken along line II-II in FIG. 1.

First, a configuration of a composite apparatus including a reading apparatus according to the first embodiment of the present invention will be described. FIG. 1 is a front view showing a composite apparatus 1 according to the first embodiment. FIG. 2 is a sectional view of the composite apparatus 1 taken along line II-II in FIG. 1. In FIG. 1, an X direction and a Y direction are defined as shown by arrows in FIG. 1. The X direction and the Y direction are perpendicular to each other. Further, a direction perpendicular to both of the X direction and the Y direction is referred to as a Z direction. Here, a plane (i.e., an XY plane) parallel to both of the X direction and the Y direction is a horizontal surface, and the Z direction is a vertical direction.

As shown in FIG. 1, the composite apparatus 1 of the first embodiment includes a printer section 2 (i.e., an image forming apparatus) and a scanner section 3 (i.e., a reading apparatus). In this example, the printer section 2 includes LEDs (Light Emitting Diodes), and is configured to form a color image on a recording sheet (i.e., a recording medium) by electrophotographic method. However, the printer section 2 is not limited to such a configuration. The printer section 2 can also be configured to form an image on the recording medium using a laser method, an inkjet method, a dot-matrix impact method or the like.

<Configuration of Printer Section>

As shown in FIG. 2, the printer section 2 includes a feeding unit 21 (i.e., a medium feeding unit) that feeds the recording sheet, an image forming section 22 that forms an image on the recording sheet, a fixing unit 25 that fixes the image to the recording sheet, and an ejection unit 26 that ejects the recording sheet.

The feeding unit 21 includes a feeding cassette 211 (i.e., medium storage unit). The feeding cassette 211 is detachably mounted to a casing 2a of the printer section 2. The feeding cassette 211 includes a placing plate 212 for placing the recording sheets thereon. A feeding roller 213 (i.e., a medium feeding member) is provided so as to contact a leading end (i.e., a front end) of the recording sheet placed on the placing plate 212. A separation piece 214 is provided so as to face the feeding roller 213. The separation piece 214 is provided for separating the recording sheet one by one.

The feeding roller 213 rotates counterclockwise in FIG. 2 about a rotation axis parallel to the Y direction. The feeding roller 213 rotates to feed the recording sheets one by one from the placing plate 212 into a conveying path (i.e., a medium conveying path) for image formation.

A pair of registration rollers 215 and a pair of conveying rollers 216 are provided along the conveying path of the recording sheet. The registration rollers 215 and the conveying rollers 216 rotate about rotation axes parallel to the Y direction. The registration rollers 215 correct skew of the recording sheet fed by the feeding roller 213, and further convey the recording sheet. The conveying rollers 216 convey the recording sheet (conveyed from the registration rollers 215) toward the image forming section 22 described later.

Sensors 271, 272 and 273 are provided along the conveying path of the recording sheet. The sensors 271, 272 and 273 are configured to detect passage of the recording sheet. The sensor 271 is disposed upstream of the registration rollers 215. Detection signal of the sensor 271 is used to determining a timing to start rotation of the registration rollers 215. The sensor 272 is disposed upstream of the conveying rollers 216. Detection signal of the sensor 272 is used to determining a timing to start rotation of the conveying rollers 216. The sensor 273 is provided downstream of the conveying rollers 216. Detection signal of the sensor 273 is used to determine a timing to start light emission of the respective LED heads 233 described later.

The image forming section 22 is provided above the feeding unit 21. The image forming section 22 includes process units (i.e., image forming units) 23K, 23Y, 23M and 23C and a transfer unit 24.

The process units 23K, 23Y, 23M and 23C are arranged in this order along the conveying path of the recording sheet. The process units 23K, 23Y, 23M and 23C are configured to form toner images (i.e., developer images) using black, yellow, magenta and cyan toners (i.e., developers). The process units 23K, 23Y, 23M and 23C have the same configurations except the toners, and therefore collectively referred to as the process unit 23.

The process unit 23 includes a photosensitive drum 231 (i.e., as an image bearing body or a latent image bearing body), a charging roller 232 (i.e., a charging member), a developing roller 234 (i.e., a developer bearing body), a supplying roller 235 (i.e., a developer supplying member), and a toner cartridge 236 (i.e., a developer storage body).

The photosensitive drum 231 is rotatable in one direction (clockwise in FIG. 2) about a rotation axis parallel to the Y direction. The charging roller 232 and the developing roller 234 are arranged in this order along a rotating direction of the photosensitive drum 231. An LED (Light Emitting Diode) head 232 (i.e., an exposure device) is disposed between the charging roller 232 and the developing roller 234 along the rotating direction of the photosensitive drum 231.

The photosensitive drum 231 is substantially in the form of a cylinder, and has a photosensitive layer (i.e., an electron generation layer and an electron transfer layer) on a surface thereof. The charging roller 232 is applied with a predetermined charging voltage. The charging roller 232 uniformly charges the surface (i.e., the photosensitive layer) of the photosensitive drum 231. The LED head 233 emits light so as to irradiate the surface of the photosensitive drum 231 (having been uniformly charged by the charging roller 232) to form a latent image. The developing roller 234 is applied with a predetermined developing voltage. The developing roller 234 develops the latent image on the surface of the photosensitive drum 231 with toner, and forms a toner image (i.e., a developer image). The supplying roller 235 supplies the toner to the developing roller 234. The toner cartridge 236 is detachably mounted to a main body of the process unit 23. The toner cartridge 236 supplies the toner to the developing roller 234 and the supplying roller 236.

The transfer unit 24 is disposed below the process units 23K, 23Y, 23M and 23C. The transfer unit 24 includes a transfer belt 241 made of an endless belt. The transfer belt 241 is wound around a driving roller 242 and a driven roller 243. The driving roller 242 rotates about a rotation axis parallel to the Y direction to move the transfer belt 241. The transfer belt 241 electrostatically absorbs the recording sheet at a surface of the transfer belt 241, and conveys the recording sheet in the X direction along the process units 23K, 23Y, 23M and 23C.

The transfer unit 24 further includes four transfer rollers 244 respectively provided so as to face the photosensitive drums 231 of the process units 23K, 23Y, 23M and 23C. The transfer rollers 244 are pressed against the photosensitive drums 231 of the process units 23K, 23Y, 23M and 23C via the transfer belt 241. The transfer rollers 244 are applied with predetermined transfer voltage. The transfer rollers 244 transfer the toner images from the surfaces of the photosensitive drums 231 to the recording sheet.

The fixing unit 25 is disposed downstream of the image forming section 22 along the conveying path of the recording sheet. The fixing unit 25 is configured to heat and press the recording sheet (to which the toner image has been transferred) to fix the toner image to the recording sheet. For example, the fixing unit 25 includes a fixing roller 251 having an internal heat source, and a pressure roller 252 pressed against the fixing roller 251.

The ejection unit 26 is disposed downstream of the fixing unit 25 along the conveying path of the recording sheet. The ejection unit 26 includes a pair of ejection rollers 261 and another pair of ejection rollers 262. The ejection unit 26 ejects the recording sheet (to which the toner image has been fixed by the fixing unit 25) to outside the printer section 2. A stacker portion 263 is provided on a top cover 2f covering an upper part of the casing 2a of the printer section 2. The ejected printing sheets are placed on the stacker portion 263.

Referring back to FIG. 1, a pair of stays 2b and 2c are provided on the casing 2a of the printer section 2. The stay 2b is disposed on a left end (i.e., an end in the −Y direction) of the casing 2a. The stay 2b has a rotation supporting portion 2d for rotatably supporting the scanner section 3. The stay 2c is provided on the right end (i.e., an end in the +Y direction) of the casing 2a. The stay 2c contacts a bottom surface of the scanner section 3 in a state where the scanner section 3 is closed.

The stay 2b is made thicker than the stay 2c so as to have a sufficient strength. In this embodiment, a power source unit, a driving motor, gears, a control circuit board, a high-voltage board and cables (not shown) are provided below the stay 2b.

<Configuration of Scanner Section>

Figure 3:
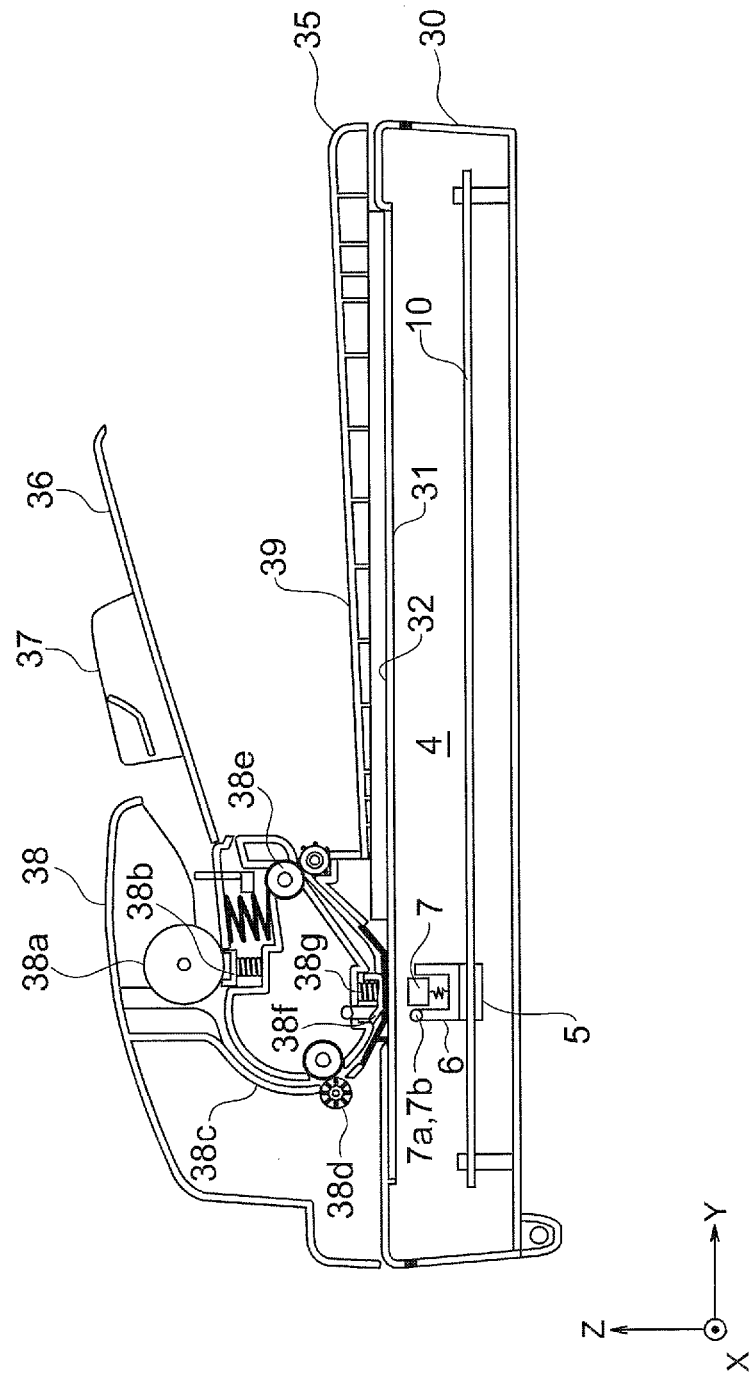
FIG. 3 is a sectional view showing a configuration of a scanner section of the composite apparatus according to the first embodiment.

The scanner section 3 is provided above the printer section 2. The scanner section 3 is supported by the stays 2b and 2c. FIG. 3 is a sectional view showing a configuration of the scanner section 3. The scanner section 3 includes a flatbed unit 30 (i.e., a document reading stage), and a document cover unit 35 (i.e., a document holding section). An operation panel 33 (FIG. 1) is provided on a front side (i.e., +X side) of the flatbed unit 30. The operation panel 33 is operated by a user to operate the composite apparatus 1.

As shown in FIG. 3, the flatbed unit 30 includes a document placing plate 31 made of material (for example, a transparent glass) that transmits light. A surface of the document placing plate 31 is a document placing surface 32 on which a document (i.e., a reading medium) is placed. A CIS (Contact Image Scanner) unit 7 is provided below the document placing plate 31. The CIS unit 7 (i.e., a reading portion) is configured to read an image of the document placed on the document placing surface 32. The CIS unit 7 is mounted on a carriage unit 4 (i.e., a reading unit) which will be described later.

The document cover unit 35 includes a document tray 36, document width guides 37, a document conveying device 38 and a document receiving portion 39.

The document tray 36 is a tray for placing a plurality of documents. The document width guides 37 are used to define a position of the document in a widthwise direction (i.e., the X direction) on the document tray 36. The document width guides 37 are disposed on both sides of the document in the widthwise direction. The document conveying device 38 is configured to convey the documents one by one from the document tray 36 toward the document placing plate 31. The document conveying device 38 is also referred to as an automatic document feeder (ADF). The document receiving portion 39 is a portion on which the documents conveyed by the document conveying device 38 are placed.

The document conveying device 38 includes a pickup roller 38a and a separation pad 38b for feeding the documents one by one from the document tray 36. The document conveying device 38 further includes a pair of conveying rollers 38d that convey the document (fed by the pickup roller 38a and the separation pad 38b) along a document conveying path 38c, and a pair of ejection rollers 38e that eject the conveyed document to the document receiving portion 39.

A document holding member 38f is provided on a bottom part of the document conveying path 38c. The document holding member 38f is configured to hold the document (conveyed along the document conveying path 38c) against the document placing plate 31. A coil spring 38 (i.e., a biasing member) is provided on an upper side of the document holding member 38f. The coil spring 38 biases the document holding member 38f toward the document placing plate 31. The document holding member 38f and the document placing plate 31 define a reading position (in the case where the document conveying path 38 is used).

In the case where the document conveying path 38 is used, the documents on the document tray 36 are fed into the document conveying path 38c one by one by the pickup roller 38a and the separation pad 38b. Each document is conveyed along the document conveying path 38c by the conveying rollers 38d. The document is conveyed, and is held by the document holding member 38f against the document placing plate 31. The CIS unit 7 reads an image of the document conveyed through the reading position.

Figure 4A:
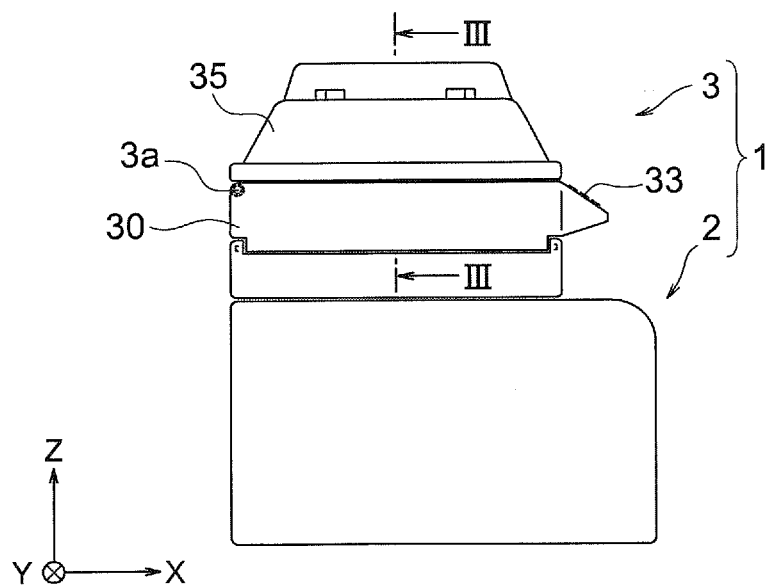
FIG. 4A is a side view showing the composite apparatus according to the first embodiment in a state where a document cover unit is closed.
Figure 4B:
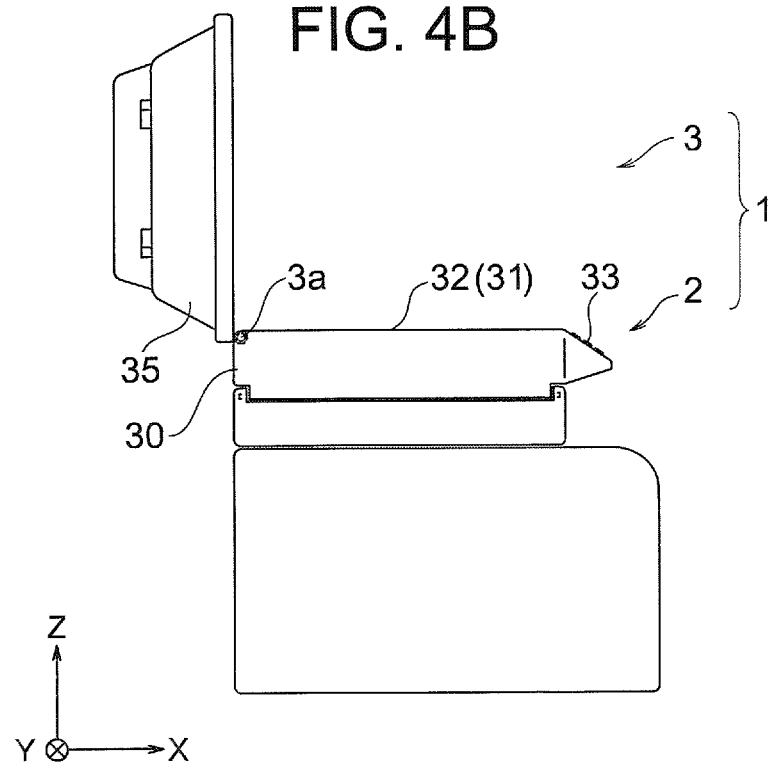
FIG. 4B is a side view showing the composite apparatus according to the first embodiment in a state where the document cover unit is opened.

In this regard, the document cover unit 35 is rotatable so as to open the document placing plate 31. FIG. 4A is a side view showing the composite apparatus 1 in a state where the document cover unit 35 is closed. FIG. 4B is a side view showing the composite apparatus 1 in a state where the document cover unit 35 is opened.

As shown in FIGS. 4A and 4B, the document cover unit 35 is supported by a rotation shaft 3a extending parallel to the Y direction (i.e., a left-right direction). The rotation shaft 3a is disposed at a rear part of the flatbed unit 30. The document cover unit 35 is rotatable between a closing position as shown in FIG. 4A and an opening position as shown in FIG. 4B. In the closing position shown in FIG. 4A, the document cover unit 35 covers the document placing surface 32. In the opening position shown in FIG. 4B, the document cover unit 35 opens the document placing surface 32. A rotating angle of the document cover unit 35 is, for example, 90 degrees.

In a state where the document cover unit 35 is in the closing position as shown in FIG. 4A, the document conveying device 38 conveys the document, and the CIS unit 7 reads the conveyed document at a home position (i.e., a fixed position).

In contrast, in a state where the document cover unit 35 is in the opening position as shown in FIG. 4B, the user places the document on the document placing surface 32, and the CIS unit 7 reads the document while moving in the Y direction along a surface of the document as described later.

<Carriage Unit>

Figure 5:
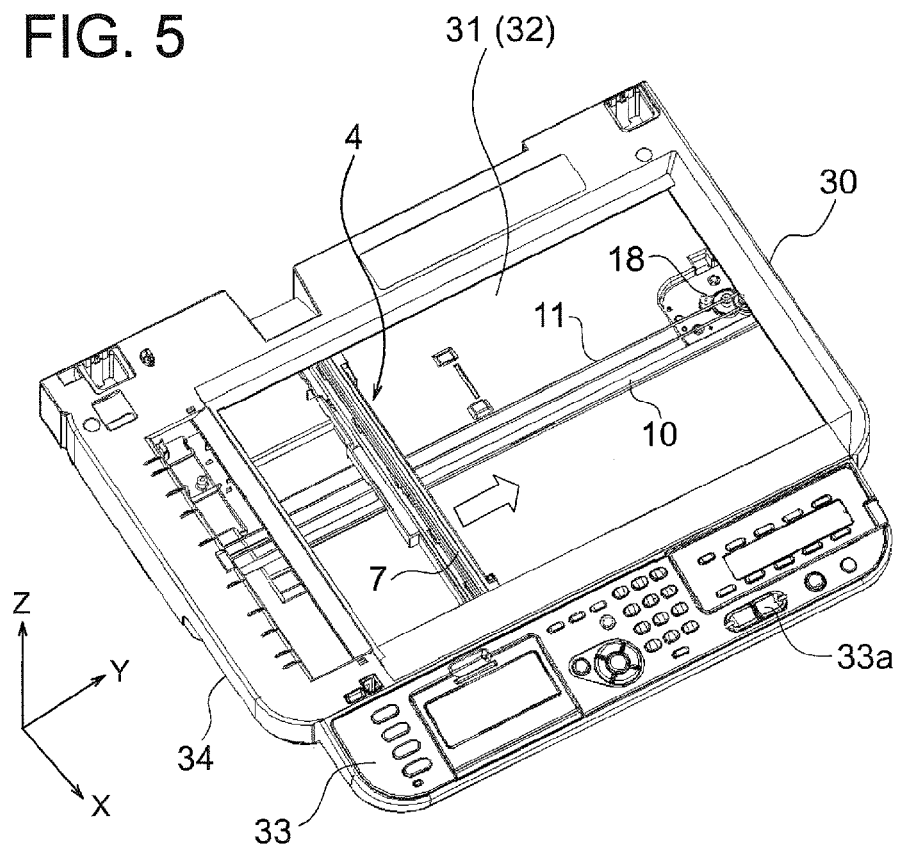
FIG. 5 is a top perspective view showing a flatbed unit including the reading apparatus according to the first embodiment.

FIG. 5 is a top perspective view showing the flat bed unit 30. The document cover unit 35 (FIG. 4) is omitted in FIG. 5. The carriage unit 4 (i.e., a reading unit) is provided on the flatbed unit 30. The carriage unit 4 includes the CIS unit 7 (i.e., the reading portion).

The CIS unit 7 is disposed proximate to a lower surface of the document placing plate 31. The CIS unit 7 reads an image of the document placed on the document placing surface 32 (i.e., the upper surface of the document placing plate 31).

Figure 6:
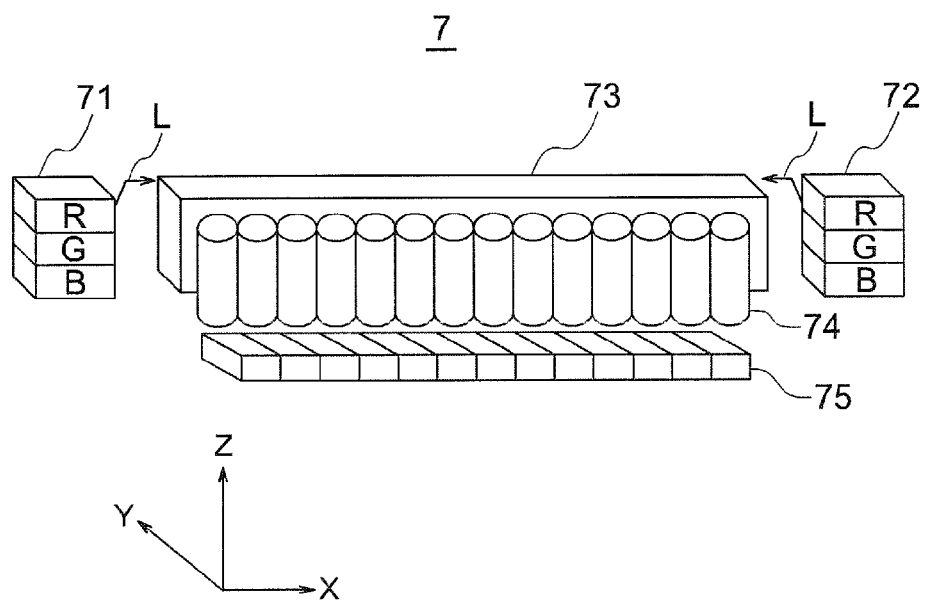
FIG. 6 is a schematic view for illustrating a configuration of a CIS unit according to the first embodiment.

FIG. 6 is a schematic view showing a configuration of the CIS unit 7. The CIS unit 7 includes a first light source 71, a second light source 72, a light guiding plate 73 (constituting an optical system), a rod lens array 74, and a plurality of imaging elements 75. The light guiding plate 73 and the rod lens array 74 constitute an optical system. Each imaging element 75 is formed of, for example, a CMOS (Complementary Metal-Oxide Semiconductor).

The imaging elements 75 are arranged in the X direction (i.e., a main scanning direction) parallel to a longitudinal direction of the CIS unit 7. Although 14 imaging elements 75 are shown in FIG. 6 for convenience of illustration, the number of the imaging elements 75 corresponds to the number of pixels in the main scanning direction.

Each of the light sources 71 and 72 includes a plurality of light emitting elements that emit light of different colors. In this example, each of the light sources 71 and 72 includes three LEDs that emit light of red (R), green (G) and blue (B).

The light guiding plate 73 is elongated in the X direction. Both end surfaces (i.e., incident surfaces) of the light guiding plate 73 respectively face the light sources 71 and 72. The light emitted by the light sources 71 and 72 enters the light guiding plate 73, and is emitted from an upper surface (i.e., an exit surface) of the light guiding plate 73 toward the document placing plate 31 (FIG. 5).

The rod lens array 74 includes lens elements (i.e., rod lenses) arranged in the X direction. Each lens element is disposed on an exit side of the corresponding one of the imaging elements 75. Each lens element is configured to focus a light reflected at the surface of the document to the corresponding one of the imaging elements 75.

When reading the document in a color mode, red, green and blue LEDs of each of the light sources 71 and 72 are switched at a high speed to illuminate a document on the document placing surface 32 with red, green and blue light. The light reflected at the surface of the document is incident on the imaging elements 75 via the rod lens array 74. The imaging elements 75 convert incident light (i.e., light signal) into electric signal.

Figure 7:
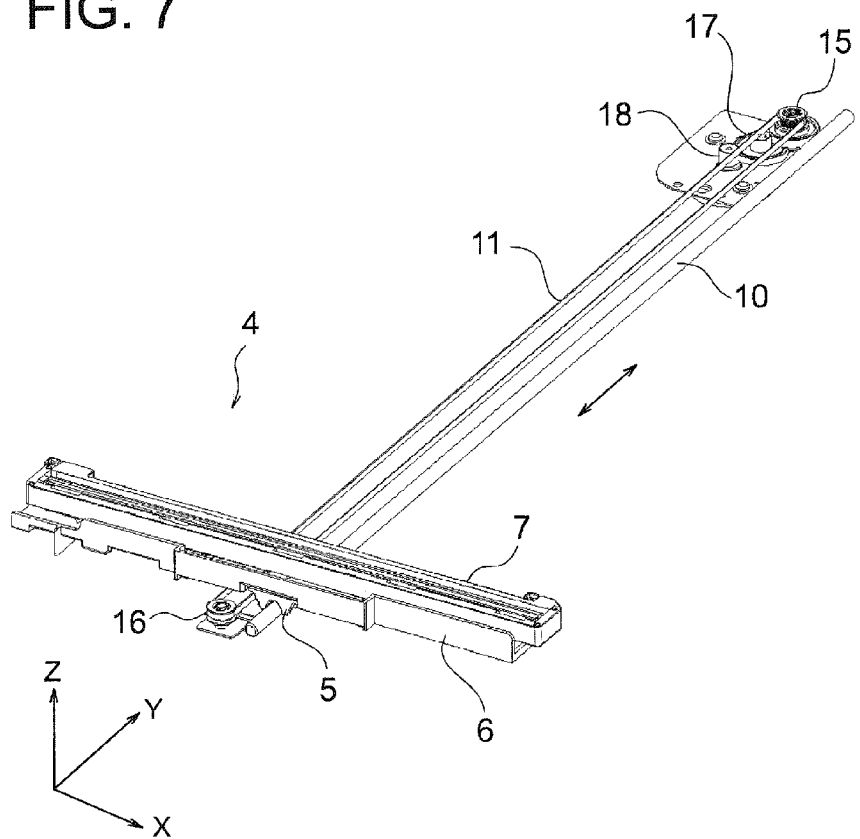
FIG. 7 is a perspective view showing a carriage unit and a moving mechanism according to the first embodiment.
Figure 8:
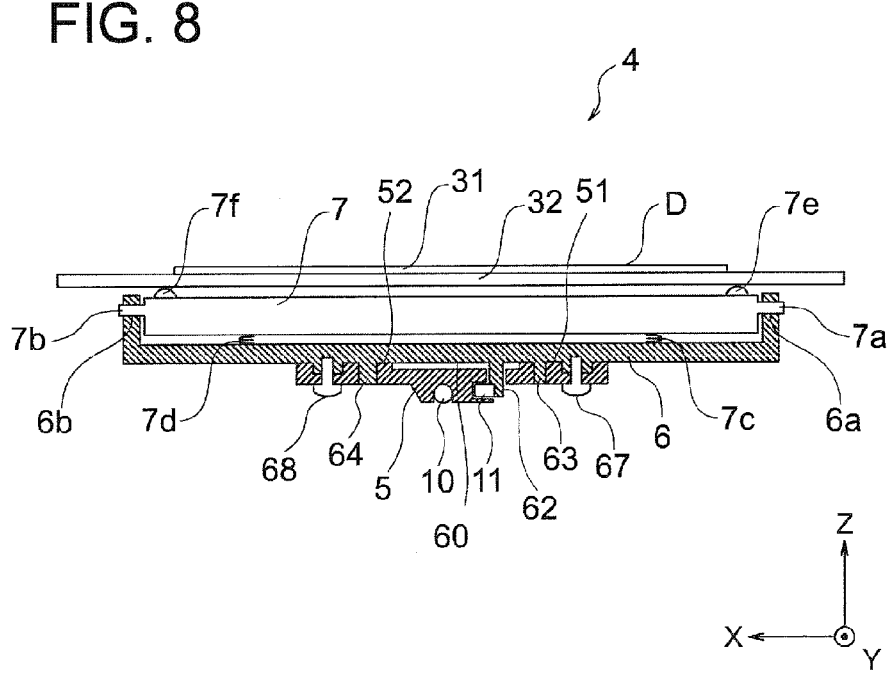
FIG. 8 is a sectional view showing the carriage unit according to the first embodiment.

FIG. 7 is a perspective view showing a carriage unit 4 and a moving mechanism for moving the carriage unit 4. FIG. 8 is a sectional view showing a configuration of the carriage unit 4. As shown in FIG. 7, the carriage unit 4 (i.e., the reading unit) includes the CIS unit 7 (i.e., the reading portion), a slider 5 (i.e., a sliding portion) and a carriage 6 (i.e., a holding portion).

As shown in FIG. 8, the CIS unit 7 includes a pair of shafts 7a and 7b. The shafts 7a and 7b are coaxial with each other and extend in the X direction (i.e., the longitudinal direction of the CIS unit 7). The shafts 7a and 7b engage shaft-receiving portions 6a and 6b of the carriage 6. The shaft-receiving portions 6a and 6b are formed on both ends of the carriage 6 in the X direction. That is, the CIS unit 7 is supported so as to be rotatable about the shafts 7a and 7b in the X direction. The shafts 7a and 7b are disposed at an end of the CIS unit 7 in −Y direction (see FIG. 3).

Further, a pair of coil springs 7c and 7d (i.e., biasing members) are provided between a bottom surface of the CIS unit 7 and the carriage 6. The coil springs 7c and 7d bias the CIS unit 7 toward the document placing plate 31. A pair of contact portions 7e and 7f are provided on an upper surface of the CIS unit 7 (i.e., a surface of the CIS unit 7 facing the document placing plate 31). The contact portions 7e and 7f contact the document placing plate 31. The contact portions 7e and 7f are formed of material having excellent sliding property and high self-lubricating property. The contact portions 7e and 7f are disposed in the vicinities of both ends of the CIS unit 7 in the X direction.

With such a configuration, the carriage unit 7 moves in the Y direction in a state where the contact portions 7e and 7f are pressed against the document placing plate 31 by forces of the coil springs 7c and 7d. Therefore, the CIS unit 7 is prevented from being inclined in the X direction.

As shown in FIG. 7, the moving mechanism for moving the carriage unit 4 includes a shaft 10 (i.e., a movement-restriction unit) that guides the carriage unit 4 in the Y direction, and a timing belt 11 (i.e., a driving member) for moving the carriage unit 4. The moving mechanism further including a driving pulley 15 and a driven pulley 16 around which the timing belt 11 is wound, a motor 18 (i.e., a driving source) for rotating the driving pulley 15, and an idle gear 17 for transmitting a rotation of the motor 18 to the driving pulley 15.

Figure 9:
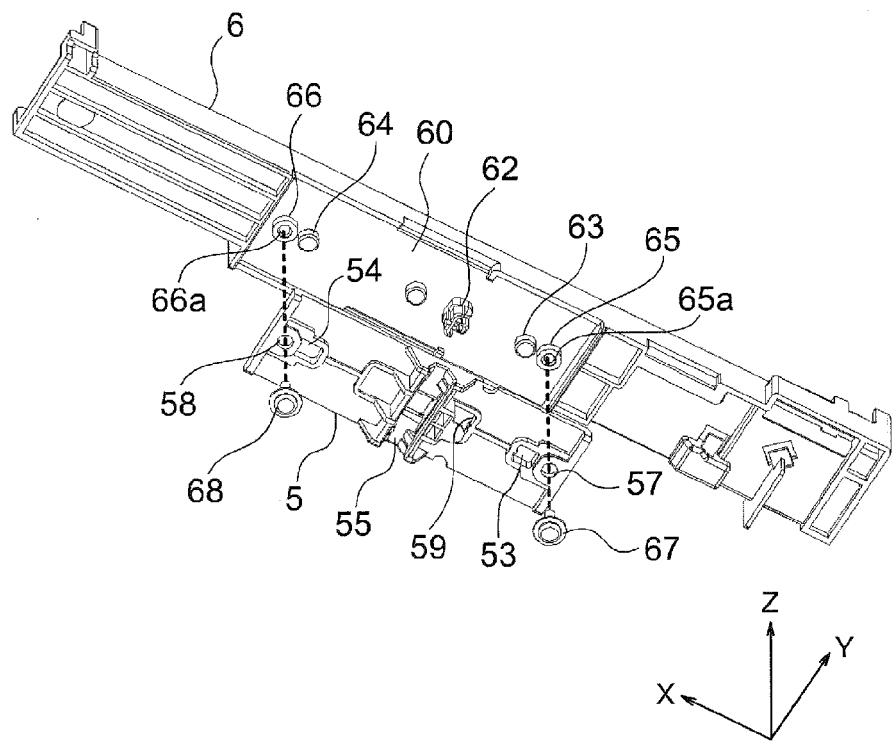
FIG. 9 is a bottom perspective view showing a carriage and a slider according to the first embodiment.

FIG. 9 is a bottom perspective view showing the carriage 6 and the slider 5. The carriage 6 has a rectangular shape elongated in the X direction. The carriage 6 has an abutting surface 60 (i.e., an abutting portion or a first surface) on a side (in this example, a lower side) opposite to a side on which the CIS unit 7 is held. The abutting surface 60 is parallel to the XY plane. An engaging portion 62, convex portions 63 and 64 (i.e., fitting portions or positioning portions), and bosses 65 and 66 (i.e., fixing portions) protrude in −Z direction (i.e., direction toward the slider 5) from the abutting surface 60.

In this example, the abutting surface 60 is provided in a predetermined area including a center portion of the carriage 6 in the X direction. The engaging portion 62 is disposed at a position which is shifted from the center portion of the carriage 6 by a predetermined amount. The convex portions 63 and 64 are disposed at positions symmetrical to each other with respect to the center portion of the carriage 6 in the X direction. The bosses 65 and 66 are disposed at positions symmetrical to each other with respect to the center portion of the carriage 6 in the X direction. These bosses 65 and 66 are disposed outside of the convex portions 63 and 64 in the X direction.

The abutting surface 60 is a surface contacting the slider 5 fixed to a lower side of the carriage 6. The engaging portion 62 engages the timing belt 11. The convex portions 63 and 64 respectively engage a fitting hole 53 and an elongated hole 54 (described later) to determine a position of the slider 5. The bosses 65 and 66 have threaded holes (i.e., internal threads) 65a and 66a. Screws 67 and 68 for fixing the slider 5 to the carriage 6 respectively engage the threaded holes 65a and 66a.

The carriage 6 is formed of, for example, PPS/PS (i.e., a polymer alloy composed of polyphenylene-ether and polystyrene) as a first resin. To be more specific, the carriage 6 is formed of "Xyron" (trademark) manufactured by Asahi Kasei Corporation. This is effective in preventing deformation of the carriage 6 in the longitudinal direction.

Figure 10:
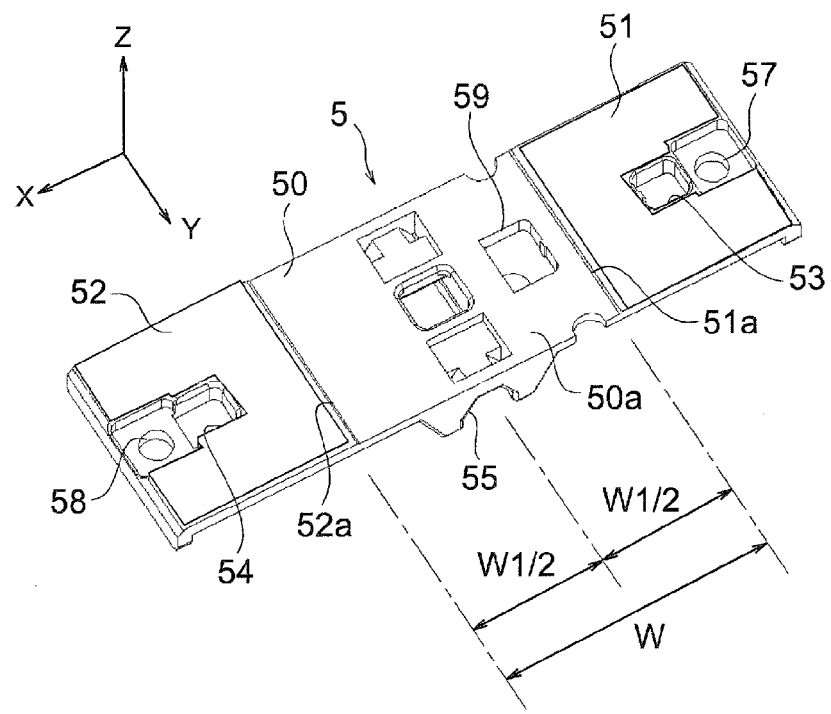
FIG. 10 is a top perspective view showing the slider according to the first embodiment.

FIG. 10 is a top perspective view showing the slider 5. The slider 5 is fixed to the carriage 6. The slider 5 has contact surfaces 51 and 52 (i.e., first contact portions) that contact the abutting surface 60 of the carriage 6, and a concave portion 50

(i.e., a second concave) provided between the contact surfaces 51 and 52 in the X direction. Further, an engaging portion 55 (i.e., a slidable contact portion) is provided on a side (in this example, a lower side) of the slider 5 opposite to the contact surfaces 51 and 52.

The contact surfaces 51 and 52 are disposed on both sides of the concave portion 50 in the X direction. Further, the contact surfaces 51 and 52 are parallel to the XY plane. In other words, each of the contact surfaces 51 and 52 extends in the X direction (i.e., a longitudinal direction of the carriage 6) and also extends in the Y direction (i.e., an axial direction of the shaft 10). The contact surfaces 51 and 52 are in the same position (i.e., on the same plane) in the Z direction.

The concave portion 50 has a bottom surface 50a (i.e., a second surface) parallel to the XY plane. The bottom surface 50a is disposed at a position shifted downward (i.e., a direction away from the carriage 6) from the contact surfaces 51 and 52. Step portions 51a and 52a are formed between the bottom surface 50a and the contact surfaces 51 and 52. The step portions 51a and 52a are disposed outside of the engaging portion 55 (described below) in the X direction.

The engaging portion 55 is disposed on a lower side (i.e., a side in −Z direction) of the slider 5. In other words, the engaging portion 55 is disposed on a side opposite to the contact surfaces 51 and 52. The engaging portion 55 is located at a substantially center portion between the step portion 51a and the step portion 52a in the X direction. In this regard, the term "substantially center portion" refers to a portion in a range of ±20% with respect to a center portion. The engaging portion 55 extends in the Y direction, i.e., an axial direction of the shaft (i.e., a moving direction of the carriage unit 4). The engaging portion 55 is a contact portion which is in slidable contact with the shaft 10.

A through-hole 59 is formed on the concave portion 50 of the slider 5. The engaging portion 62 of the carriage 6 is inserted through the thorough hole 59. A fitting hole 53 (i.e., a fitting portion) is formed on the contact surface 51 of the slider 5. The convex portion 63 of the carriage 6 fits into the fitting hole 53. An elongated hole 54 (i.e., a fitting portion) is formed on the contact surface 52 of the slider 5. The convex portion 64 of the carriage 6 fits into the elongated hole 54. A relative position of the slider 5 and the carriage 6 is determined in the XY plane by fitting the convex portion 63 into the fitting hole 53 and fitting the convex portion 64 into the elongated hole 54.

A through-hole 57 is formed on the contact surface 51 of the slider 5. A screw 67 is inserted through the through-hole 57 of the slider 5, and engages the threaded hole 65a (FIG. 9) of the carriage 6. A through-hole 58 is formed on the contact surface 52 of the slider 5. A screw 68 is inserted through the through-hole 58 of the slider 5, and engages the threaded hole 66a (FIG. 9) of the carriage 6.

The slider 5 slidably moves along the shaft 10. Therefore, in the case where the shaft 10 is formed of metal, the slider 5 is preferably formed of a material having a low friction coefficient with respect to the metal and having high self-lubricating property in view of abrasion resistance and sliding property. For example, the slider 5 is formed of POM (Poly Oxy Methylene) as a second resin.

The carriage 6 and the slider 5 have different shape and are made of different material. That is, the carriage 6 and the slider 5 have different natural frequencies.

Figure 11:
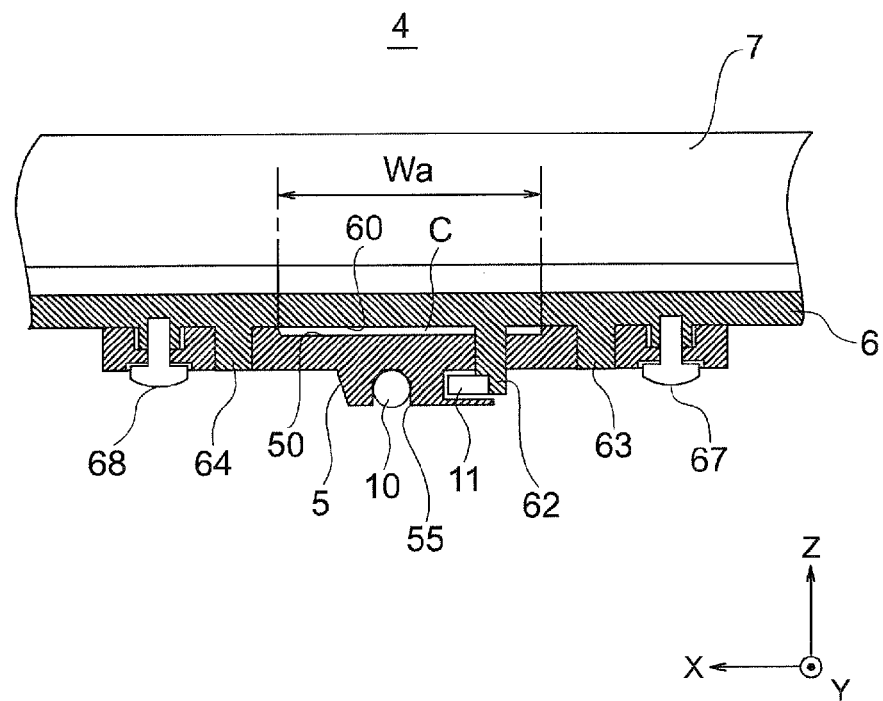
FIG. 11 is a sectional view showing the carriage and the slider according to the first embodiment.

FIG. 11 is a sectional view showing the carriage 6 and the slider 5. When the above described screws 67 and 68 (FIG. 9) engage the threaded holes 65a and 65b, the abutting surface 60 of the carriage 6 contacts the contact surfaces 51 and 52 of the slider 5, so that the carriage 6 and the slider 5 are fixed to each other. In this regard, the CIS unit 7 has already been mounted to the carriage 6. In this way, the carriage unit 4 is assembled as an integral body. The engaging portion 62 of the carriage 6 protrudes the through-hole 59 of the slider 5, and engages the timing belt 11.

In this state, a gap C (i.e., a first region) is formed between the abutting surface 60 of the carriage 6 and the bottom surface 50a of the slider 5. The gap C is formed substantially symmetrically with respect to a center of the shaft 10 in the X direction (i.e., the longitudinal direction of the carriage 6). Further, the gap C is disposed at a region between the shaft 10 and the carriage 6.

In this embodiment, a distance W1/2 (FIG. 10) from a center of the slider 5 (in this example, a center of the engaging portion 55) in the X direction to each of the step portions 51a and 52a is 17 mm. A distance W1 (FIG. 10) between the step portion 51a and the step portion 52a is 34 mm. Therefore, a dimension (width) Wa of the gap C in the X direction is 34 mm. In this example, a dimension (length) of the CIS unit 7 in the X direction is 236 mm. Therefore, the dimension Wa of the gap C in the X direction corresponds to approximately 14% of the dimension of the CIS unit 7 in the X direction.

In this regard, the dimension Wa of the gap C in the X direction is preferably in a range from 3% to 50% with respect to the dimension (length) of the CIS unit 7 in the X direction. Further, the dimension Wa of the gap C in the X direction is preferably larger than an outer diameter (in this embodiment, 6 mm) of the shaft 10, which provides an effect of suppressing vibration directly transmitted from the shaft 10. Further, when the dimension Wa of the gap C in the X direction is smaller than a half of the dimension (length) of the CIS unit 7 in the X direction, there is a further effect of suppressing vibration directly transmitted from the shaft 10.

Referring back to FIG. 7, the shaft 10 extends in the Y direction, and has a length longer than a moving range of the carriage unit 4. Both ends of the shaft 10 in the Y direction (i.e., the axial direction) are fixed to a frame 34 (FIG. 5) of the flatbed unit 30. The shaft 10 is formed of, for example, metal.

The driving pulley 15 is disposed in the vicinity of an end (in this example, an end in +Y direction) of the shaft 10. The driving pulley 15 is formed integrally with a gear portion to which a rotation is transmitted. The driven pulley 16 is disposed in the vicinity of the other end (in this example, an end in −Y direction) of the shaft 10. The timing belt 11 (i.e., an endless belt) is wound around the driving pulley 15 and the driven pulley 16.

The idle gear 17 engages the gear portion of the driving pulley 15. The motor 18 has an output shaft to which a motor gear is fixed. The motor gear engages the idle gear 17. Therefore, the idle gear 17 transmits a rotation of the motor 18 to the driving pulley 15.

The operation panel 33 shown in FIG. 5 has a switch 33a which is pressed to start reading an image. When the switch 33a is pressed, the motor 18 starts rotating according to an instruction of a control unit (not shown). The rotation of the motor 18 is transmitted to the driving pulley 15 via the idle gear 17. The rotation of the driving pulley 15 causes the timing belt 11 (wound around the driving pulley 15 and the driving pulley 16) to move. When the timing belt 11 moves, the carriage unit 4 moves in the Y direction by the engagement between the timing belt 11 and the engaging portion 62 of the carriage 6.

<Operation of Composite Apparatus>

Next, an operation of the composite apparatus 1 will be described. Here, description will be made of a case where the user opens the document cover unit 35 of the scanner section 3 as shown in FIG. 4B and places the document on the document placing surface 32.

<Reading Operation>

When the user places the document on the document placing surface 32, and presses the switch 33a (i.e., an image reading switch) of the operation panel 33, the control unit starts a reading operation of the document. That is, the light sources 71 and 72 (FIG. 6) of the CIS unit 7 emit light of three colors (red, blue and green) while switching the colors at a high speed. The light emitted by the light sources 71 and 72 is guided by the light guiding plate 73, and the document placed on the document placing surface 32 is illuminated with the light. Reflection light from the document is incident on the imaging elements 75 via the microlens array 74. In this way, the CIS unit 7 reads a line image of the document in the X direction (i.e., the main scanning direction).

Figure 12:
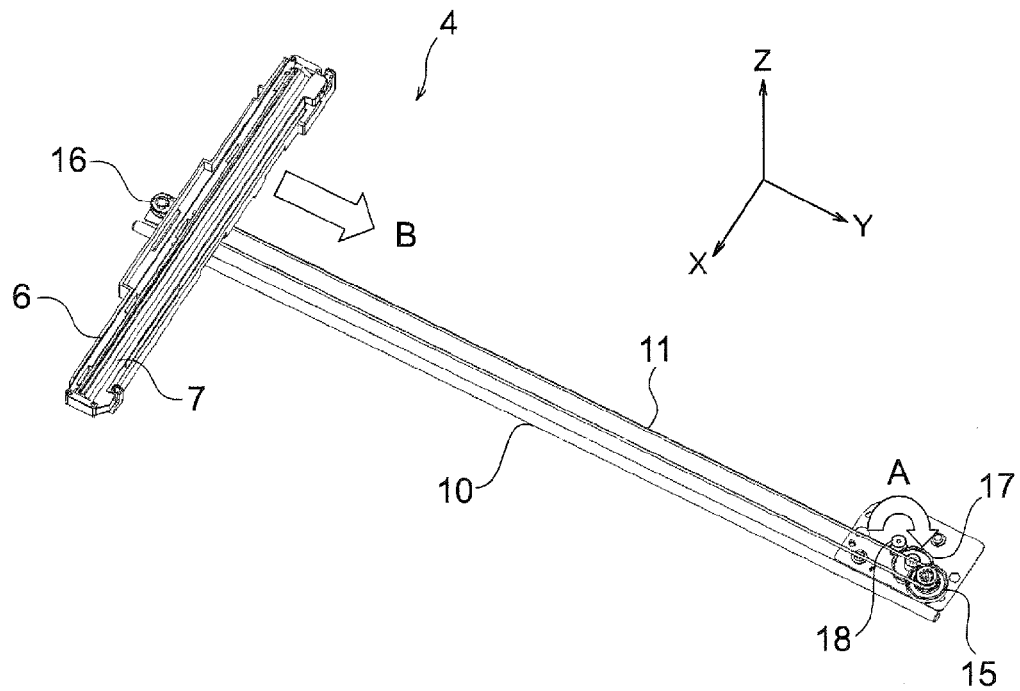
FIG. 12 is a perspective view showing a movement of the carriage unit according to the first embodiment.

As the CIS unit 7 starts reading the line image, the motor 18 starts rotating to move the carriage unit 4 (including the CIS unit 7) in the Y direction, i.e., a sub-scanning direction. FIG. 12 is a perspective view showing a movement of the carriage unit 4.

The motor 18 starts rotating in a direction shown by an arrow A in FIG. 12. When the motor 18 rotates, the idle gear 17 engaging the motor gear also rotates, and the driving pulley 15 engaging the idle gear 17 also rotates. As the driving pulley 15 rotates, the timing belt 11 wound around the driving pulley 15 and the driving pulley 16 moves. Further, the carriage 6 to which the CIS unit 7 is mounted moves in +Y direction as shown by an arrow B in FIG. 12 by the engagement between the timing belt 11 and the engaging portion 62 (FIG. 11) of the carriage 6.

The carriage unit 4 moves in the Y direction in such a manner that the engaging portion 55 slides along the shaft 10, and in such a manner that the contact portions 7e and 7f (FIG. 8) of the CIS unit 7 biased by the coil springs 7c and 7d (FIG. 8) are pressed against the lower surface of the document placing plate 31. That is, the CIS unit 7 of the carriage unit 4 moves in the Y direction (i.e., the sub scanning direction) while reading the line images in the X direction (i.e., the main scanning direction). In this way, the CIS unit 7 reads a two-dimensional image of the document.

When the carriage unit 4 reaches a terminal end of the movable range in the Y direction, the CIS unit 7 ends the reading of the line images, and the motor 18 stops rotating. Thereafter, the motor 18 starts rotating in a reverse direction, and moves the carriage unit 4 in −Y direction to a home position. In this way, the reading operation of the document by the scanner section 3 is completed.

Further, if the above described switch 33a is a switch for starting a copying operation, the printer section 2 performs an image forming operation described below.

<Image Forming Operation>

When the reading operation by the scanner section 3 is completed as described above, the control unit causes the printer section 2 (FIG. 2) to start the image forming operation. First, the feeding roller 213 starts rotating to feed the recording sheet one by one from the feeding cassette 211 into the conveying path. Further, the registration rollers 215 and the conveying rollers 216 convey the recording sheet toward the image forming section 22.

In the image forming section 22, the driving roller 242 rotates to move the transfer belt 241. The transfer belt 241 holds the recording sheet by absorption and conveys the recording sheet. The recording sheet is conveyed through the process units 23K, 23Y, 23M and 23C.

In each process unit 23, the photosensitive drum 231 rotates, and the charging roller 232, the developing roller 234 and the supplying roller 235 also rotate. The charging roller 232 uniformly charges the surface of the photosensitive drum 231. The LED head 233 emits light so as to expose the surface of the photosensitive drum 231 according to image data of respective colors based on image information read by the scanner section 3, and a latent image is formed on the surface of the photosensitive drum 231.

The latent image on the surface of the photosensitive drum 231 is developed with the toner by developing roller 234, and a toner image (i.e., a developer image) is formed on the surface of the photosensitive drum 231. The toner image is transferred from the surface of the photosensitive drum 231 to the recording sheet on the transfer belt 241 by the transfer voltage applied to the transfer roller 244.

In this way, the toner images of respective colors formed by the process units 23K, 23Y, 23M and 23C are transferred to the recording sheet on the transfer belt 241. The recording sheet (to which the toner image has been transferred) is further conveyed by the transfer belt 241 to the fixing unit 25.

In the fixing unit 25, the fixing roller 251 and the pressure roller 252 nip the recording sheet, and apply heat and pressure to the recording sheet. With the heat and pressure, the toner image is fixed to the recording sheet. The recording sheet to which the toner image is fixed is ejected by the ejection rollers 261 and 262, and is placed on the stacker portion 263. In this way, the image forming operation is completed.

Here, the copying operation in which the reading operation and the image forming operation are continuously performed has been described. However, the reading operation is not limited to that performed in the copying operation. For example, the reading operation can be performed in a facsimile transmitting operation in which the document is read and transmitted as data. Further, the reading operation can be performed in a scanning operation in which the document is read and stored in a server or the like.

<Function and Effect>

In the above described reading operation, in order to smoothly move the carriage unit 4 along the shaft 10, it is necessary to provide a slight clearance between the engaging portion 55 of the slider 5 and the shaft 10. However, if such a clearance is provided, vibration may be generated at a contact portion between the engaging portion 55 and the shaft 10 when the carriage unit 4 moves along the shaft 10. The vibration generated between the engaging portion 55 and the shaft 10 may be transmitted from the slider 5 to the carriage 6, and may be transmitted to the CIS unit 7.

However, according to the first embodiment of the present invention, the gap C is provided between the slider 5 and the carriage 6. Therefore, the vibration generated between the engaging portion 55 and the shaft 10 (i.e., vibration transmitted to the center portion of the slider 5) is less likely to be transmitted to the carriage 6. As a result, the transmission of the vibration to the CIS unit 7 can be suppressed, and accuracy of reading by the CIS unit 7 can be enhanced.

Figure 13A:
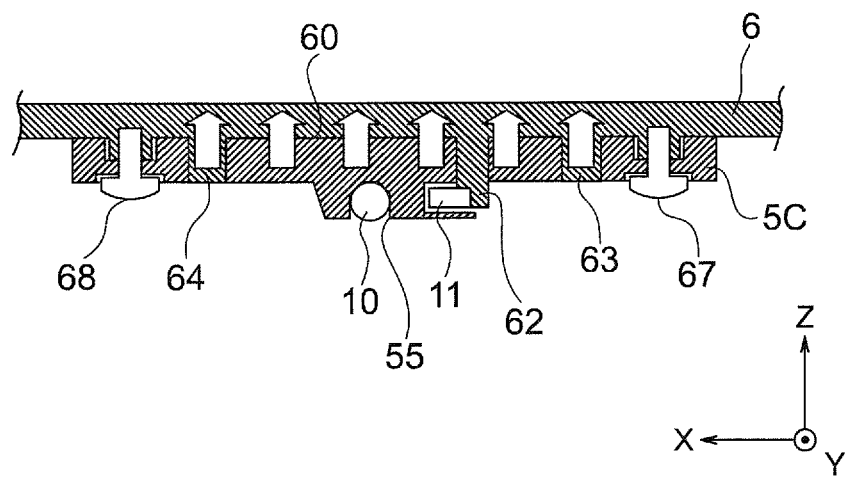
FIG. 13A is a schematic view for illustrating a vibration transmission in a carriage unit of Comparison Example.
Figure 13B:
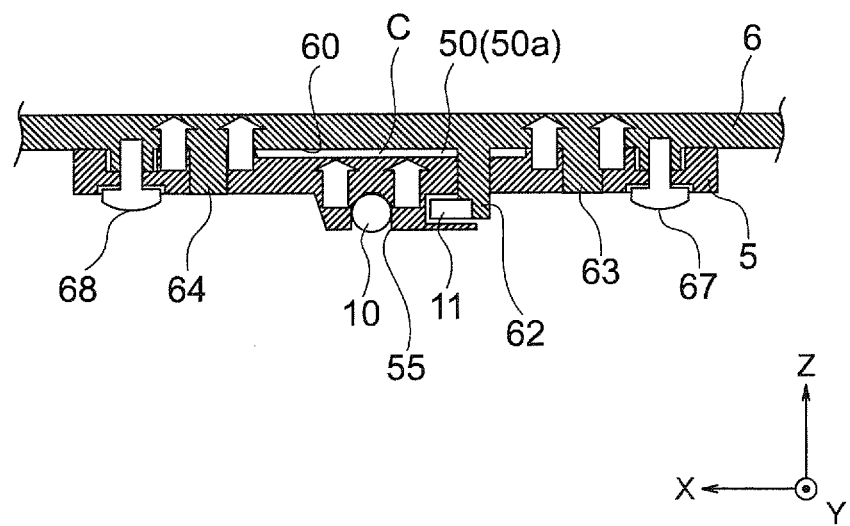
FIG. 13B is a schematic view for illustrating a vibration transmission in the carriage unit according to the first embodiment.

FIG. 13A is a schematic view for illustrating a vibration transmission in a carriage unit of Comparison Example. FIG. 13B is a schematic view for illustrating a vibration transmission in the carriage unit 4 of the first embodiment. In the carriage unit of Comparison Example (FIG. 13A), a slider 5C has no concave portion 50. Other structures of the carriage unit of Comparison Example are the same as those of the carriage unit 4 of the first embodiment (FIG. 13B).

In other words, in the carriage unit of Comparison Example, an upper surface (i.e., a surface on +X side) of the slider 5C entirely contacts the abutting surface 60 of the carriage 6. In contrast, in the carriage unit 4 of the first embodiment, the contact surfaces 51 and 52 on both sides of the concave portion of the slider 5C contact the abutting surface 60 of the carriage 6.

In the carriage unit of Comparison Example, vibration generated between the engaging portion 55 of the slider 5C and the shaft 10 is transmitted from the entire upper surface of the slider 5C to the carriage 6 over a wide range as shown by arrows in FIG. 13A. Therefore, the carriage 6 is more likely to be vibrated. The vibration of the carriage 6 is transmitted to the CIS unit 7, and may cause deterioration of the accuracy of reading.

In contrast, in the carriage unit 4 of the first embodiment, the gap C is formed between the slider 5 and the carriage 6. Therefore, the transmission of the vibration from the slider 5 to carriage 6 is less likely to occur. Particularly, since the gap C is disposed at the center portion of the slider 5 in the X direction, the vibration generated at the contact portion between the engaging portion 55 and the shaft 10 (disposed at a substantially center portion of the slider 5) is less likely to be transmitted to the carriage 6. Therefore, it becomes possible to effectively suppress the transmission of the vibration to the CIS unit 7, and to enhance the accuracy of reading.

FIGS. 14A and 14B are graphs showing measurement results of vibrations of the CIS unit 7 and the slider 5C of the carriage unit of Comparison Example shown in FIG. 13A. The vibration of the CIS unit 7 (FIG. 14A) is measured by mounting an acceleration sensor to the CIS unit 7. The vibration of the slider 5C (FIG. 14B) is measured by mounting the acceleration sensor to the slider 5C. In FIGS. 14A and 14B, a horizontal axis represents time (second), and a vertical axis represents acceleration ($m/s^2$).

FIGS. 15A and 15B are graphs showing measurement results of vibrations of the CIS unit 7 and the slider 5 of the carriage unit 4 of the first embodiment. In FIGS. 15A and 15B, a horizontal axis represents time (second), and a vertical axis represents acceleration ($m/s^2$).

As shown in FIG. 14A, the vibration of the CIS unit 7 of the carriage unit of Comparison Example is large. This is because the slider 5C and the carriage 6 contact each other over a large area as shown in FIG. 13A. As the slider 5C and the carriage 6 contact each other over a large area, the vibration is more likely to be transmitted from the slider 5 to the carriage 6, and the CIS unit 7 is more likely to be vibrated. Further, the vibration of the carriage 6 is also transmitted to the slider 5, and therefore the vibration of the slider 5 is also large as shown in FIG. 14B.

In contrast, as shown in FIG. 15A, the vibration of the CIS unit 7 of the carriage unit 4 of the first embodiment is suppressed as compared with the Comparison Example. This is because the gap C is provided between the slider 5 and the carriage 6 as shown in FIG. 13B. As the gap C is provided between the slider 5 and the carriage 6, the transmission of the vibration from the slider 5 to the carriage 6 is suppressed, and therefore the transmission of the vibration to the CIS unit 7 is suppressed. Further, since the vibration of the carriage 6 is suppressed, the transmission of the vibration from the carriage 6 to the slider 5 is also suppressed, and therefore the vibration of the slider 5 is suppressed as shown in FIG. 15B.

As described above, according to the first embodiment of the present invention, the gap C is provided between the slider 5 and the carriage 6, and therefore the transmission of the vibration from the slider 5 to the carriage 6 can be suppressed. As a result, the vibration of the CIS unit 7 held by the carriage 6 can be suppressed, and the accuracy of reading can be enhanced.

Particularly, since the gap C is disposed between the shaft and the carriage 6, it becomes possible to effectively suppress the transmission of the vibration (generated between the slider 5 and the shaft 10) to the carriage 6. Therefore, it becomes possible to effectively suppress the vibration of the CIS unit 7, and to enhance the accuracy of reading.

To be more specific, since the gap C is disposed at the center portion of the slider 5 in the X direction close to a vibration generating source, the transmission of the vibration to the carriage 6 is effectively suppressed.

Moreover, the concave portion 50 of the slider 5 is disposed between the contact surfaces 51 and 52 in the X direction, the carriage 6 and the slider 5 can be integrated so that the carriage 6 and the slider 5 tightly contact each other while the gap C is provided therebetween.

Further, the carriage 6 and the slider 5 have different shapes and are made of different material, so that the carriage 6 and the slider 5 have different natural frequency. Therefore, resonance of the carriage 6 and the slider 5 can be prevented. Accordingly, the transmission of the vibration from the slider 5 to the carriage 6 can be further effectively suppressed.

Moreover, the fitting hole 53 is provided on the contact surface 51 of the slider 5, and the convex portion 63 of the carriage 6 engages the fitting hole 53. The elongated hole 54 is provided on the contact surface 52 of the slider 5, and the convex portion 64 of the carriage 6 engages the elongated hole 54. Therefore, positions of the carriage 6 and the slider 5 can be determined with respect to each other while the carriage 6 and the slider 5 do not contact each other at the gap portion C.

Furthermore, the through-hole 57 is provided on the contact surface 51 of the slider 5, and the screw 67 engages the threaded hole 65a of the boss 65 through the through-hole 57. The through-hole 58 is provided on the contact surface 52 of the slider 5, and the screw 68 engages the threaded hole 66a of the boss 66 through the through-hole 58. Therefore, the carriage 6 and the slider 5 can be fixed to each other while the carriage 6 and the slider 5 do not contact each other at the gap portion C.

Additionally, the engaging portion 62 of the carriage 6 protrudes through the through-hole 59 of the slider 5 and engages the timing belt 11. Therefore, it becomes possible to ensure a positioning accuracy of the carriage 6 (i.e., a positioning accuracy of the CIS unit 7 mounted on the carriage 6).

Modifications

Figure 16A:
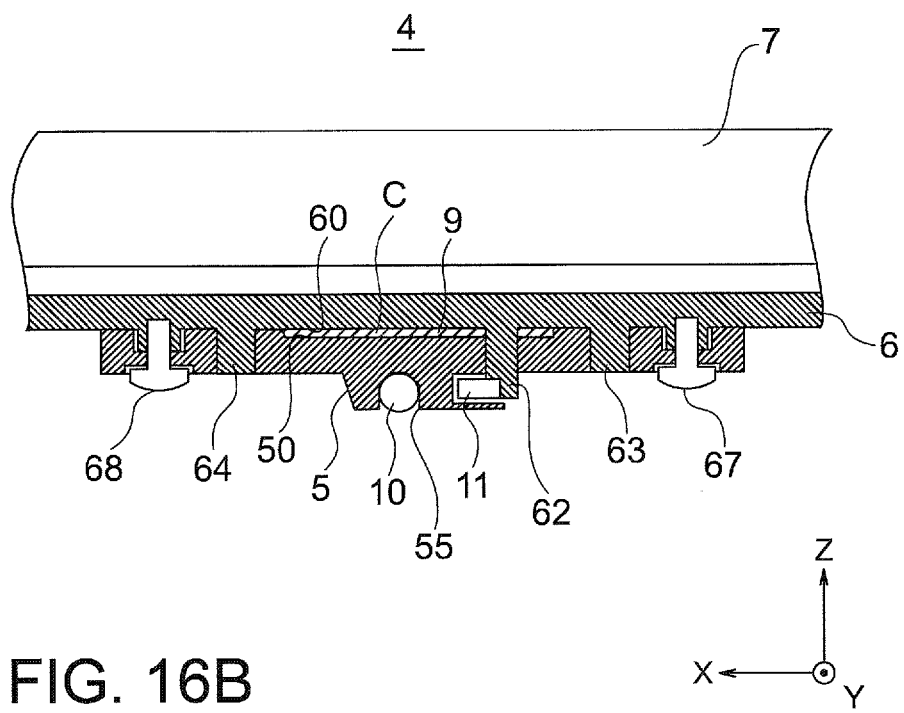
FIG. 16A is a sectional view showing a carriage unit according to a modification of the first embodiment.

FIG. 16A is a sectional view showing a carriage unit according to a modification of the first embodiment. The carriage unit shown in FIG. 16A includes a vibration damping member 9 provided in the gap C between the slider 5 and the carriage 6. The vibration damping member 9 is a member configured to damp vibration. For example, the vibration damping member 9 converts vibration energy into expansion/contraction, shearing or deformation. A vibration damping performance of the vibration damping member 9 is expressed using a coefficient of loss. The vibration damping member 9 is preferably made of a material whose coefficient of loss is higher than those of the carriage 6 and the slider 5.

Since the vibration damping member 9 is provided between the slider 5 and the carriage 6, an effect of suppressing the transmission of the vibration from the slider 5 to the carriage 6 is enhanced.

In this regard, the carriage unit 4 of the first embodiment has no member provided between the slider 5 and the carriage 6. However, if there is a member (referred to as an intervening member) provided between the slider 5 and the carriage 6, the same effect as this modification can be obtained by constructing the intervening member as the vibration damping member 9.

Figure 16B:
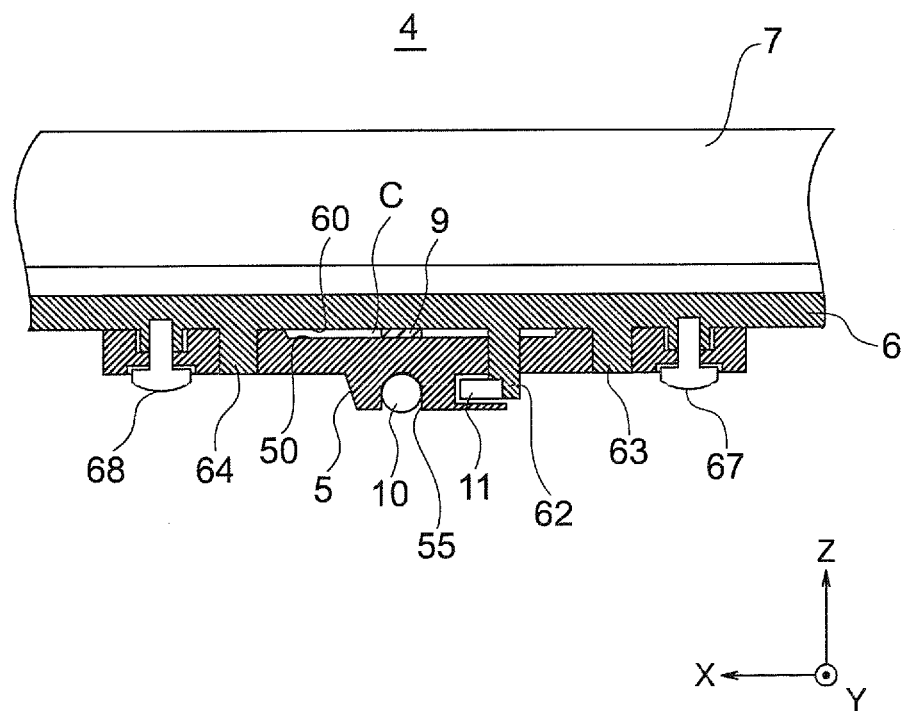
FIG. 16B is a sectional view showing a carriage unit according to another modification of the first embodiment.

In the modification shown in FIG. 16A, the vibration damping member 9 is provided an entire region in the gap C. However, as shown in FIG. 16B, it is also possible to provide the vibration damping member 9 in a partial region in the gap C.

Second Embodiment

Figure 17:
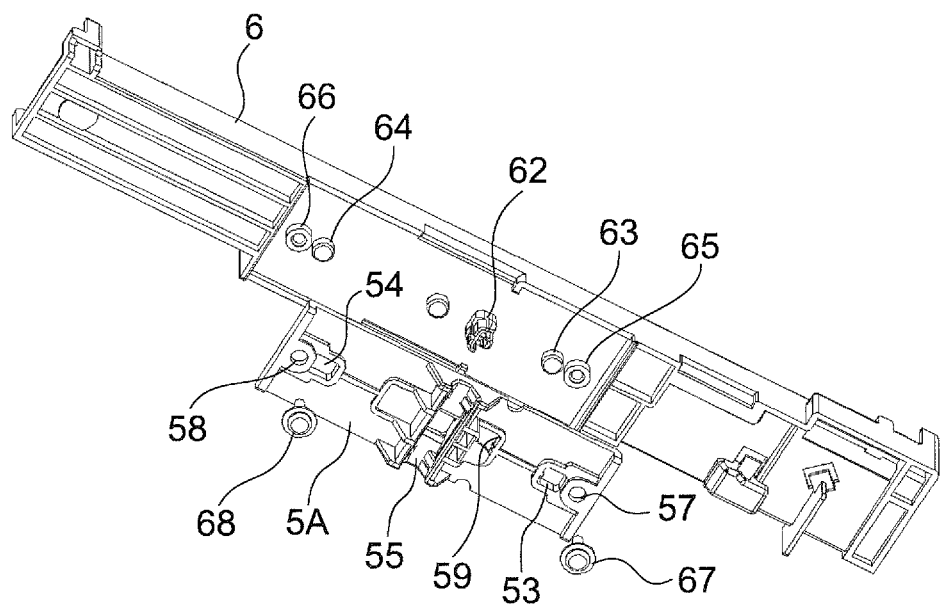
FIG. 17 is a perspective view showing a carriage and a slider according to the second embodiment of the present invention.
Figure 18:
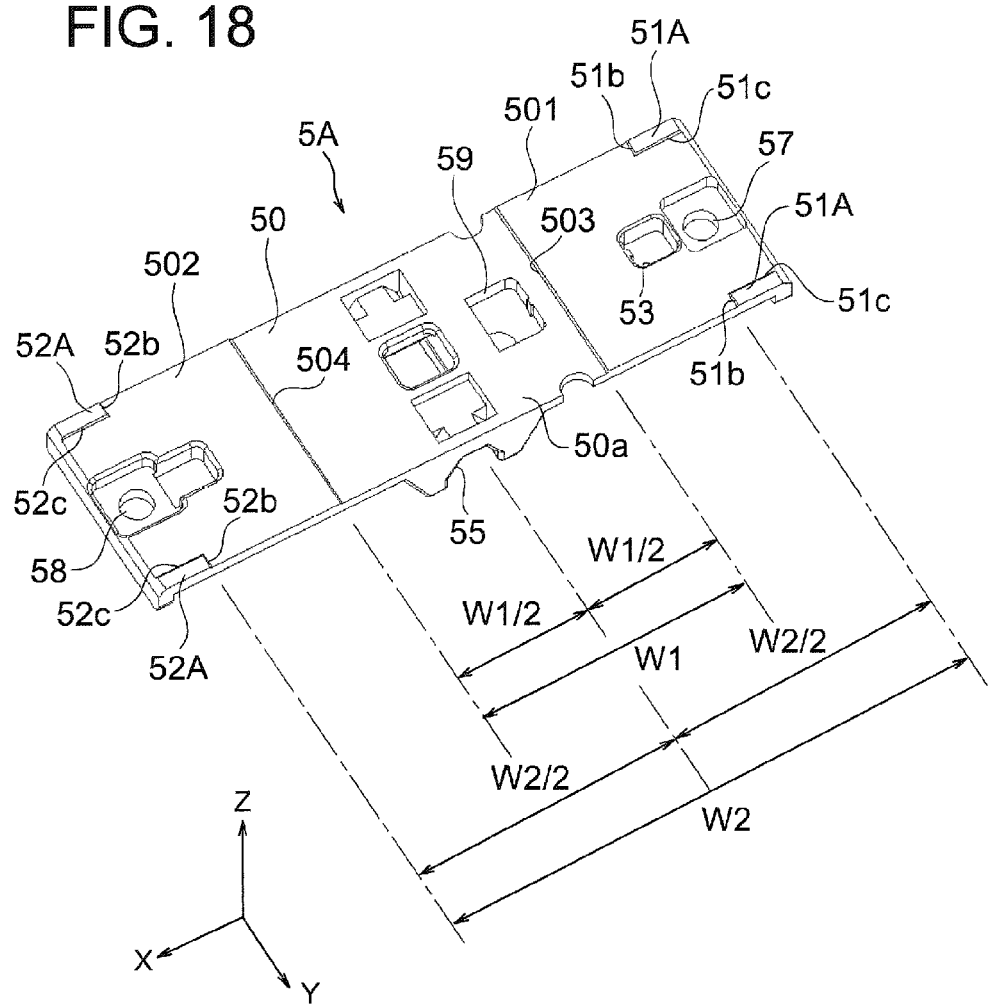
FIG. 18 is a top perspective view showing the slider according to the second embodiment.

Next, the second embodiment of the present invention will be described. The second embodiment is different from the first embodiment in a structure of a slider 5A (i.e., a sliding portion). FIG. 17 is a bottom perspective view of the slider 5A and the carriage 6 according to the second embodiment. FIG. 18 is a top perspective view showing the slider 5A. Components of the second embodiment that are the same as those of the first embodiment are assigned with the same reference numerals.

In the above described first embodiment, the contact surfaces 51 and 52 (i.e., the first contact portions) of the slider 5 contact the abutting surface 60 of the carriage 6, and the concave portion 50 is provided between the contact surfaces 51 and 52. In contrast, as shown in FIG. 18, the slider 5A of the second embodiment includes contact surfaces 51A and 52A (i.e., first contact portions) on both ends in the X direction. The contact surfaces 51A and 52A contact the abutting surface 60 of the carriage 6. Further, contact surfaces 501 and 502 (i.e., second contact portions) are provided between the concave portion 50 and the contact surfaces 51A and 52A.

As shown in FIG. 18, the contact surfaces 501 and 502 are formed on +Z side (i.e., on a side facing the carriage 6) of the slider 5A. Further, the contact surfaces 501 and 502 are disposed on both sides of the concave 50 in the X direction. The contact surfaces 501 and 502 are parallel to the XY plane. The contact surfaces 51 and 52 are in the same position (i.e., on the same plane) in the Z direction.

The concave portion 50 is recessed in −Z direction (i.e., a direction away from the carriage 6) from the contact surfaces 501 and 502. Step portions 503 and 504 are formed between the concave portion 50 and the contact surfaces 501 and 502.

The contact surfaces 51A and 52A are formed on four corners of the slider 5A, and protrude in +Z direction from the contact surfaces 501 and 502. To be more specific, two contact surfaces 51A are formed on an end of the contact surface 501 in −X direction. These two contact surfaces 51A are disposed at both ends of the contact surface 501 in the Y direction. Two contact surfaces 52A are formed on an end of the contact surface 502 in +X direction. These two contact surfaces 52A are disposed at both ends of the contact surface 502 in the Y direction. In other words, the contact surfaces 51A and 52A are disposed at predetermined intervals in the X direction (i.e., a direction perpendicular to the moving direction of the carriage unit 4) and in the Y direction (i.e., the moving direction of the carriage unit 4).

Step portions 51b and 51c are formed between each contact surface 51A and the contact surface 501. The step portion 51b faces inward of the slider 5A in the X direction. The step portion 51c faces inward of the slider 5A in the Y direction. Similarly, step portions 52b and 52c are formed between each contact surface 52A and the contact surface 502. The step portion 52b faces inward of the slider 5A in the X direction. The step portion 52c faces inward of the slider 5A in the Y direction.

In this embodiment, a distance W1/2 from a center of the slider 5A (in this example, a center of the engaging portion 55) in the X direction to each of the step portions 503 and 504 is 17 mm. A distance W1 between the step portion 503 and the step portion 504 is 34 mm. The distance W1 corresponds to approximately 14% of the length of the CIS unit 7 (236 mm).

Further, a distance W2/2 from the center of the slider 5A (in this example, the center of the engaging portion 55) in the X direction to each of the step portions 51b and 52b is 34 mm. A distance W2 between the step portion 51b and the step portion 52b is 68 mm. The distance W2 corresponds to approximately 28% of the length of the CIS unit 7 (236 mm).

Other structures of the slider 5A are the same as those the slider 5 of the first embodiment.

Figure 19:
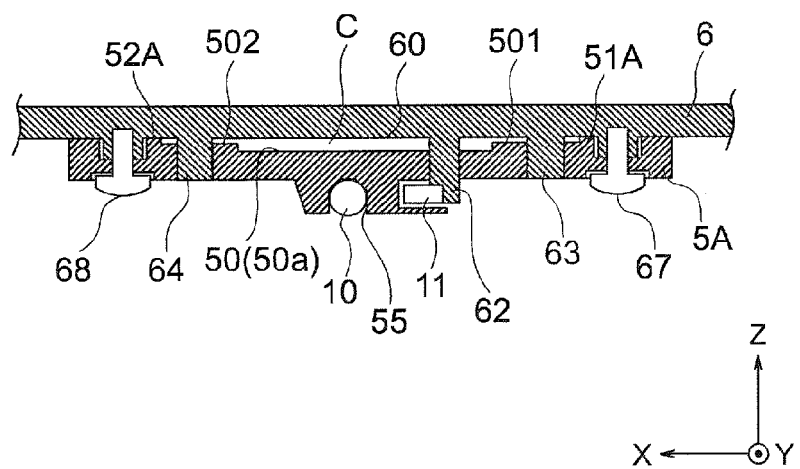
FIG. 19 is a sectional view showing the carriage and the slider according to the second embodiment.

FIG. 19 is a sectional view showing the slider 5A and the carriage 6. As shown in FIG. 19, the gap C is formed between the abutting surface 60 of the carriage 6 and the bottom surface 50a of the concave 50 and the contact surfaces 501 and 502 of the slider 5A. The gap C is formed substantially symmetrically with respect to a center of the shaft 10 (i.e., the center of the engaging portion 55) in the X direction.

The carriage 6 and the slider 5A are fixed to each other as described in the first embodiment. The CIS unit 7 is mounted to the carriage 6 as described in the first embodiment.

Figure 20:
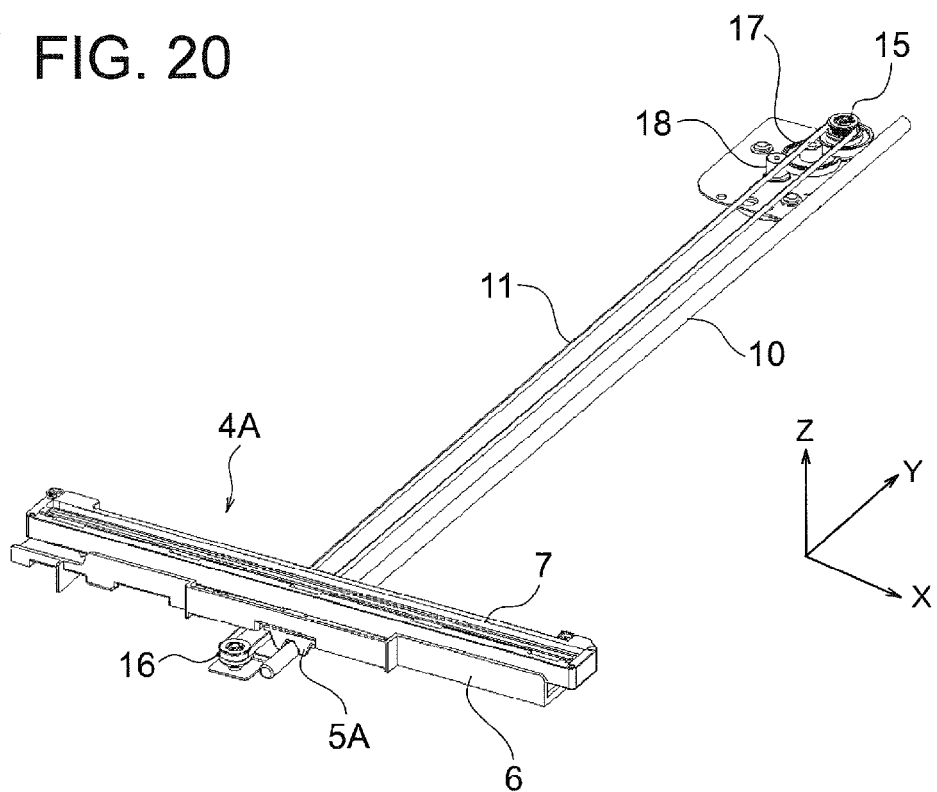
FIG. 20 is a perspective view showing a carriage unit and a moving mechanism according to the second embodiment.

FIG. 20 is a perspective view showing a carriage unit 4A (i.e., a reading unit) of the second embodiment and a moving mechanism for moving the carriage unit 4A. The carriage unit 4A and the moving mechanism are the same as those of the carriage unit 4 and the moving mechanism of the first embodiment except the configuration of the slider 5A.

Figure 21:
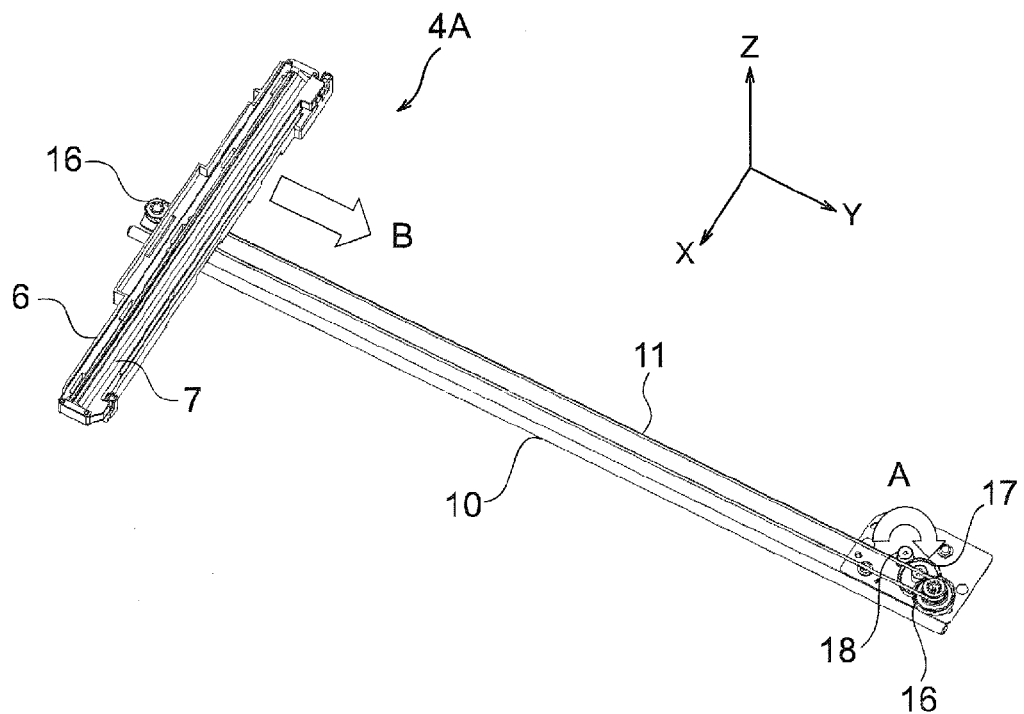
FIG. 21 is a perspective view showing a movement of the carriage unit according to the second embodiment.

FIG. 21 is a perspective view showing a movement of the carriage unit 4A of the second embodiment. When the reading operation of the document is started, the CIS unit 7 starts reading the line image, and the motor 18 starts rotating to move the carriage unit 4A (including the CIS unit 7) in the Y direction, i.e., the sub scanning direction.

As was described in the first embodiment, the motor 18 starts rotating in a direction shown by an arrow A in FIG. 21, and the timing belt 11 moves. The carriage 6 to which the CIS unit 7 is mounted moves in +Y direction as shown by an arrow B in FIG. 21. The carriage unit 4A moves in the Y direction in such a manner that the engaging portion 55 (FIG. 19) slides along the shaft 10, and in such a manner that the contact portions 7e and 7f (FIG. 8) of the CIS unit 7 are pressed against the document placing plate 31. That is, the CIS unit 7 of the carriage unit 4 moves in +Y direction (i.e., the sub scanning direction) while reading the line images in the X direction (i.e., the main scanning direction).

When the carriage unit 4A moves along the shaft 10, there is a possibility that vibration is generated between the engaging portion 55 of the slider 5A and the shaft 10. However, in the second embodiment, the gap C is provided between the slider 5A and the carriage 6. Therefore, the vibration generated between the engaging portion 55 and the shaft 10 (i.e., vibration transmitted to the center portion of the slider 5A) is less likely to be transmitted to the carriage 6. As a result, the transmission of the vibration to the CIS unit 7 can be suppressed, and accuracy of reading by the CIS unit 7 can be enhanced.

Figure 22A:
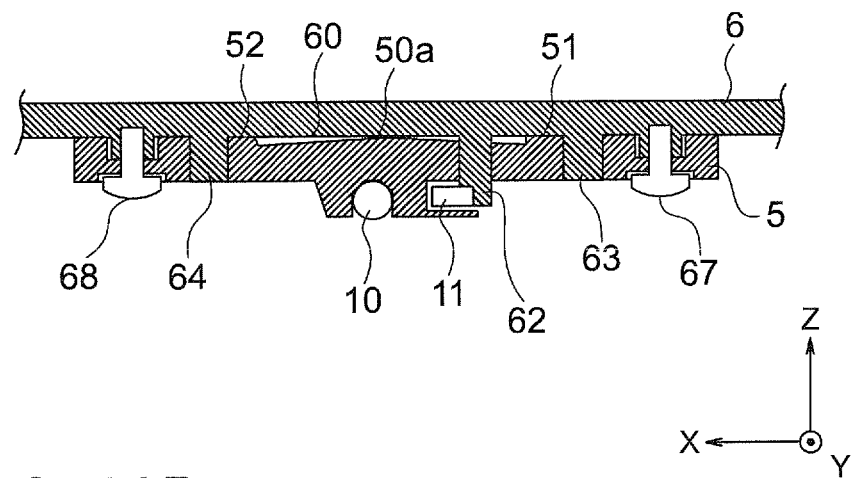
FIG. 22A is a schematic view showing a relationship between the carriage and the slider according to the first embodiment when the slider is subjected to creep deformation.
Figure 22B:
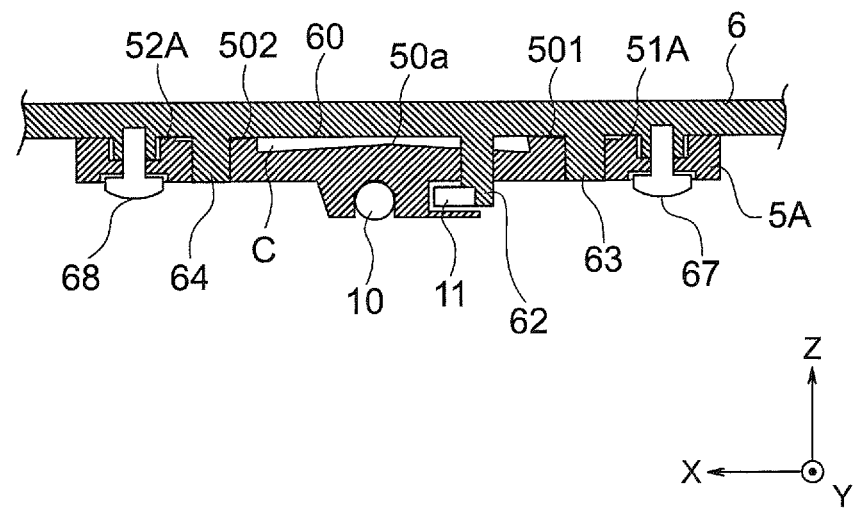
FIG. 22B is a schematic view showing a relationship between the carriage and the slider according to the second embodiment when the slider is subjected to creep deformation.

Further, according to the second embodiment, even if the slider 5A is subjected to creep deformation, an effect of suppressing the transmission of the vibration is not reduced. FIG. 22A is a sectional view showing a relationship between the slider 5 and the carriage 6 of the first embodiment when the slider 5 is subjected to the creep deformation. FIG. 22B is a sectional view showing a relationship between the slider 5A and the carriage 6 of the second embodiment when the slider 5A is subjected to the creep deformation.

As shown in FIG. 22A, if the slider 5 of the first embodiment is warped due to creep deformation so that the center portion of the slider 5 in the X direction is raised, the concave portion 50 (i.e., the bottom surface 50a) of the slider 5 may contact the center portion of the carriage 6. In such a case, the effect of suppressing the transmission of the vibration to the CIS unit 7 may be reduced.

In contrast, according to the second embodiment, as shown in FIG. 22B, the slider 5A has the bottom surface 50a of the concave 50 and the contact surfaces 501 and 502 that face the gap C. The bottom surface 50a of the concave 50 and the contact surfaces 501 and 502 constitute a stepwise surface. Therefore, if the slider 5A is warped due to creep deformation so that the center portion of the slider 5A is raised, the contact surfaces 501 and 502 may contact the carriage 6, but the bottom surface 50a of the concave 50 does not contact the carriage 6. Therefore, it becomes possible to maintain the gap C between the slider 5A and the carriage 6 at the center portion in the X direction.

The vibration generation source (i.e., a portion where the engaging portion 55 of the slider 5A and the shaft 10 contact each other) is located at the center portion of the slider 5A in the X direction. Therefore, by maintaining the gap C at the center portion in the X direction, the effect of suppressing the transmission of the vibration from the slider 5A to the carriage (i.e., the effect of suppressing the transmission of the vibration to the CIS unit 7) can be achieved.

As described above, according to the second embodiment of the present invention, the gap C is provided between the slider 5A and the carriage 6, and therefore the transmission of the vibration from the slider 5A to the carriage 6 can be suppressed. As a result, the vibration of the CIS unit 7 can be suppressed, and the accuracy of reading can be enhanced.

Further, the slider 5A has the stepwise surface (i.e., the bottom surface 50a of the concave 50 and the contact surfaces 501 and 502) facing the gap C. Therefore, even if the slider 5A is subjected to the creep deformation, the vibration of the CIS unit 7 can be suppressed, and the accuracy of reading can be enhanced.

In the above description, the total number of the contact surfaces 51A and 52A (i.e., the first contact portions) is four. However, the total number of the contact surfaces 51A and 52A may be less than four, or greater than four. In order to achieve an effect of maintaining the gap C at the center portion in the X direction when the slider 5A is subjected to creep deformation, it is preferred to arrange a plurality of first contact portions at predetermined intervals in the X direction and in the Y direction.

Third Embodiment

Figure 23:
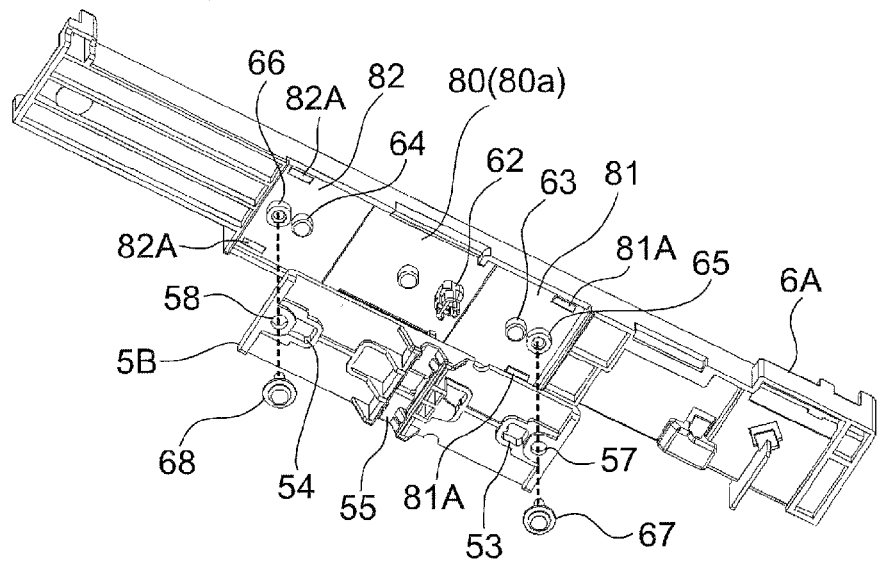
FIG. 23 is a bottom perspective view showing a carriage and a slider according to the third embodiment of the present invention.
Figure 24:
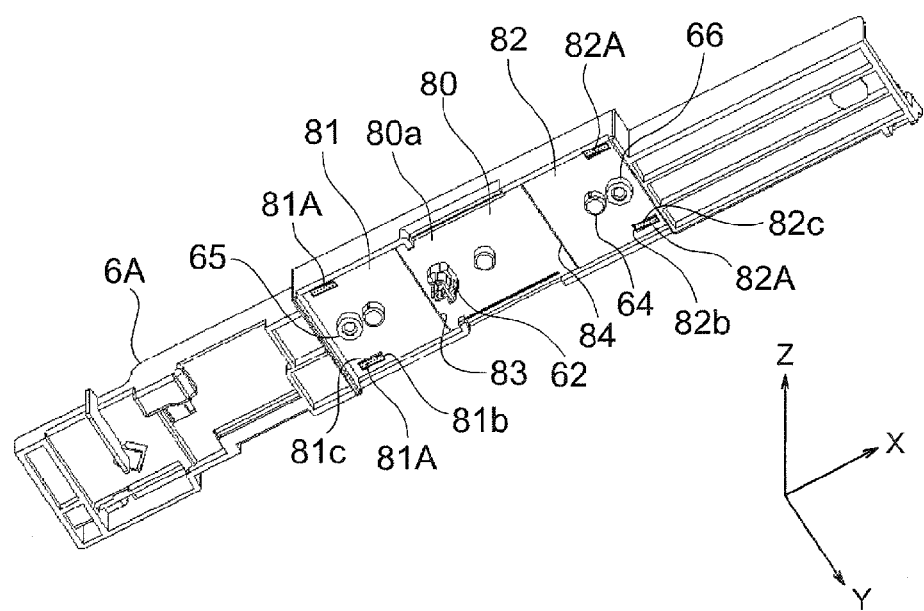
FIG. 24 is a perspective view showing the carriage according to the third embodiment.

Next, the third embodiment of the present invention will be described. The third embodiment is different from the first and second embodiments in structures of a slider 5B (i.e., a sliding portion) and a carriage 6A (i.e., a holding portion). FIG. 23 is a bottom perspective view showing the slider 5B and the carriage 6A of the third embodiment. FIG. 24 is a bottom perspective view showing the carriage 6A of the third embodiment. Components that are the same as those of the first or second embodiment are assigned with the same reference numerals.

In the above described first embodiment, the gap C is formed between the concave portion 50 of the slider 5 and the abutting surface 60 of the carriage 6. In contrast, in the third embodiment, a gap C is formed between a flat surface of the slider 5B and a concave portion 80 (i.e., a first concave) of the carriage 6A.

As shown in FIG. 23, the carriage 6A has contact surfaces 81 and 82 (i.e., second contact portions) and the concave portion 80 formed on a side (i.e. −Z side) facing the slider 5B. The contact surfaces 81 and 82 face the flat surface on +Z side of the slider 5B. The concave portion 80 is disposed between the contact portions 81 and 82 in the X direction. Further, the carriage 6A has the contact surfaces 81A and 82A (i.e., first contact portions) disposed outside the contact surfaces 81 and 82 in the X direction.

The contact surfaces 81 and 82 are formed on both sides of the concave portion 80 in the X direction. The contact surfaces 81 and 82 are parallel to the XY plane. The contact surfaces 81 and 82 are in the same position (i.e., on the same plane) in the Z direction.

As shown in FIG. 24, the concave portion 80 has a bottom surface 80a (i.e., a first surface) parallel to the XY plane. The bottom surface 80a is disposed at a position shifted upward (in a direction away from the slider 5B) form the contact surfaces 81 and 82. Step portions 83 and 84 are formed between the bottom surface 80a and the contact surfaces 81 and 82.

The contact surfaces 81A and 82A protrude in −Z direction from the contact surfaces 81 and 82. To be more specific, two contact surfaces 81A are formed on an end of the contact surface 81 in −X direction. These contact surfaces 81A are disposed on both end portions of the contact surface 81 in the Y direction. Two contact surfaces 82A are formed on an end of the contact surface 82 in +X direction. These contact surfaces 82A are disposed on both end portions of the contact surface 82 in the Y direction. In other words, the contact surfaces 81A and 82A are disposed at predetermined intervals in the X direction and in the Y direction.

Step portions 81b and 81c are formed between each contact surface 81A and the contact surface 81. The step portion 81b faces inward of the carriage 6A in the X direction, and the step portion 81c faces inward of the carriage 6A in the Y direction. Similarly, step portions 82b and 82c are formed between each contact surface 82A and the contact surface 82. The step portion 82b faces inward of the carriage 6A in the X direction, and the step portion 82c faces inward of the carriage 6A in the Y direction.

A distance between the step portion 83 and the step portion 84 is set to be, for example, the same as the distance between the step portion 503 and the step portion 504 (FIG. 18) described in the second embodiment. Further, a distance between the step portion 81b and the step portion 82b is set to be, for example, the same as the distance between the step portion 51b and the step portion 52b (FIG. 18) described in the second embodiment.

Further, the carriage 6A includes the engaging portion 62, the convex portions 63 and 64 and the bosses 65 and 66 as described in the first and second embodiments.

Figure 25:
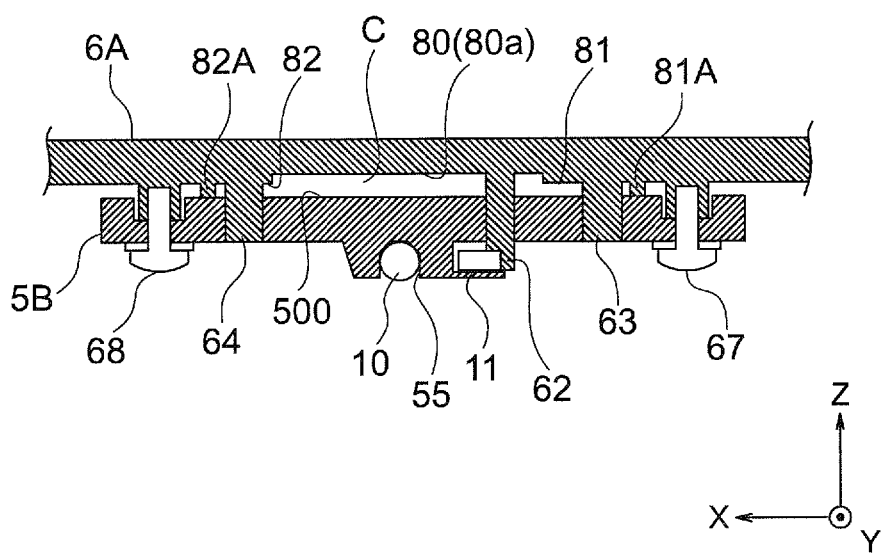
FIG. 25 is a sectional view showing the carriage and the slider according to the third embodiment.

FIG. 25 is a sectional view showing the carriage 6A and the slider 5B. A surface of the slider 5B facing the carriage 6A (i.e., a surface on +Z side) is made flat. In other words, the slider 5B has no concave portion 50 described in the first embodiment. The flat surface on +Z side of the slider 5B constitutes an abutting surface 500 (i.e., a second surface).

A gap C is formed between the abutting surface 500 of the slider 5B and the bottom surface 80a of the concave portion 80 and the contact surfaces 81 and 82 of the carriage 6A. The gap C is formed substantially symmetrically with respect to a center of the shaft 10 in the X direction.

The carriage 6A and the slider 5B are fixed to each other as described in the first embodiment. The CIS unit 7 is mounted to the carriage 6A as described in the first embodiment.

Other structures are the same as those of the first embodiment.

As was described in the first embodiment, when the carriage unit 4 moves along the shaft 10, there is a possibility that vibration is generated between the engaging portion 55 of the slider 5B and the shaft 10. However, in the third embodiment, the gap C is provided between the slider 5B and the carriage 6A. Therefore, the vibration generated between the engaging portion 55 and the shaft 10 (i.e., vibration transmitted to the center portion of the slider 5B) is less likely to be transmitted to the carriage 6A. As a result, the transmission of the vibration to the CIS unit 7 can be suppressed, and accuracy of reading by the CIS unit 7 can be enhanced.

Further, as was described in the second embodiment, if the slider 5B is warped due to creep deformation so that the center portion of the slider 5B is raised, the contact surfaces 81 and 82 of the carriage 6A contact the abutting surface 500 of the slider 5B, but the bottom surface 80a of the concave portion 80 does not contact the slider 5B. Therefore, the gap C can be maintained between the slider 5B and the carriage 6A at the center portion in the X direction. Thus, the effect of suppressing the transmission of the vibration from the slider 5B to the carriage 6A (i.e., the effect of suppressing the transmission of the vibration to the CIS unit 7) can be achieved.

As described above, according to the third embodiment of the present invention, the gap C is provided between the slider 5B and the carriage 6A, and therefore the transmission of the vibration from the slider 5B to the carriage 6A can be suppressed. As a result, the vibration of the CIS unit 7 mounted on the carriage 6A can be suppressed, and the accuracy of reading can be enhanced.

Further, the carriage 6A has the stepwise surface (i.e., the bottom surface 80a of the concave 80 and the contact surfaces 81 and 82) facing the gap C. With such a configuration, even if the slider 5B is subjected to the creep deformation, the gap C can be maintained between the slider 5B and the carriage 6A at the center portion in the X direction. Therefore, the vibration of the CIS unit 7 can be suppressed, and the accuracy of reading can be enhanced.

Modifications

In the third embodiment, the contact surfaces 81A and 82A of the carriage 6A contact the slider 5B. However, it is also possible that the carriage 6A has no contact surfaces 81A and 82A. Instead, the contact surfaces 81 and 82 contact the slider 5B. In this case, the carriage 6A has a single surface (i.e., the bottom surface 80a of the concave 80) facing the gap C.

Further, in the third embodiment, the surface (i.e., the abutting surface 500) of the slider 5B on +Z side is made flat. However, it is also possible that the slider 5B has the contact surfaces 51 and 52 and the concave portion 50 as the slider 5 of the first embodiment. It is also possible that the slider 5B has the contact surfaces 51A and 52A the contact surfaces 51 and 52 and the concave portion 50 as the slider 5A of the second embodiment.

Furthermore, in the third embodiment, the carriage 6A has the concave portion 80 and the contact surfaces 81 and 82. If there is a member (referred to as an intervening member) provided between the slider 5B and the carriage 6A is employed, it is also possible to provide the concave portion and the contact surfaces on the intervening member.

Fourth Embodiment

Next, the fourth embodiment of the present invention will be described. The fourth embodiment is different from the third embodiment in a structure of a carriage 6B (i.e., a holding portion). Further, in the fourth embodiment, the slider 5A (FIG. 18) of the second embodiment is employed.

Figure 26:
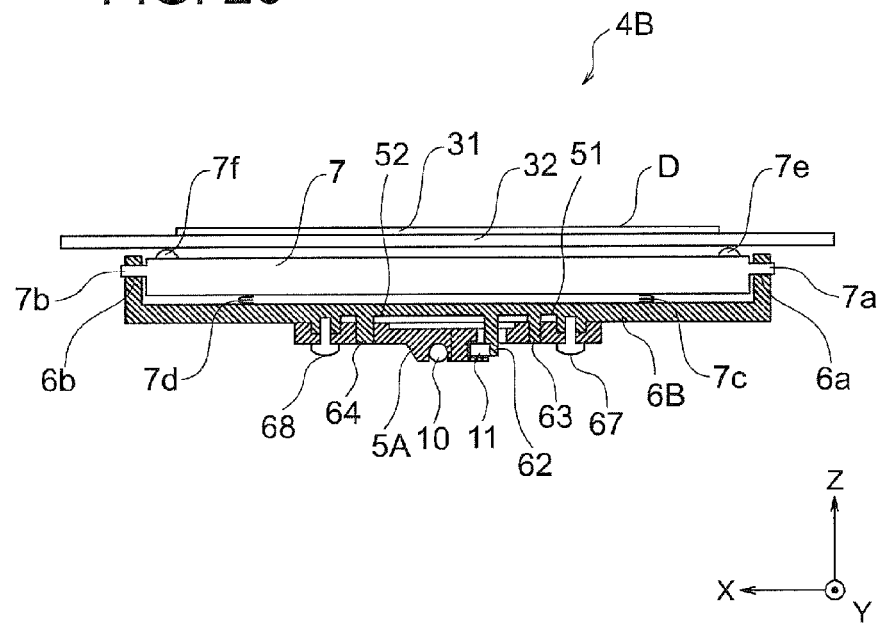
FIG. 26 is a sectional view showing a carriage unit according to the fourth embodiment of the present invention.
Figure 27:
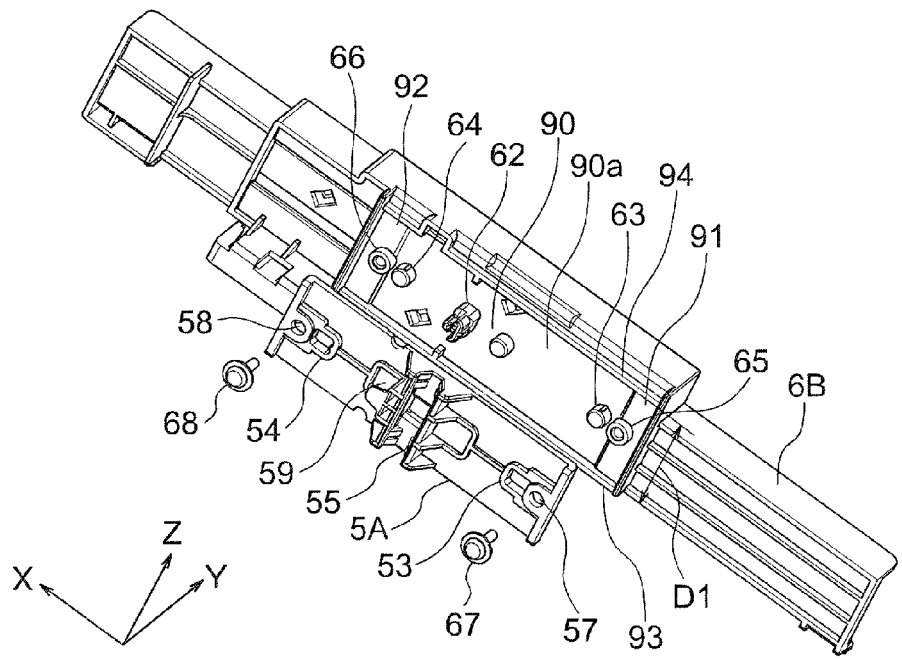
FIG. 27 is a perspective view showing a carriage and a slider according to the fourth embodiment.
Figure 28:
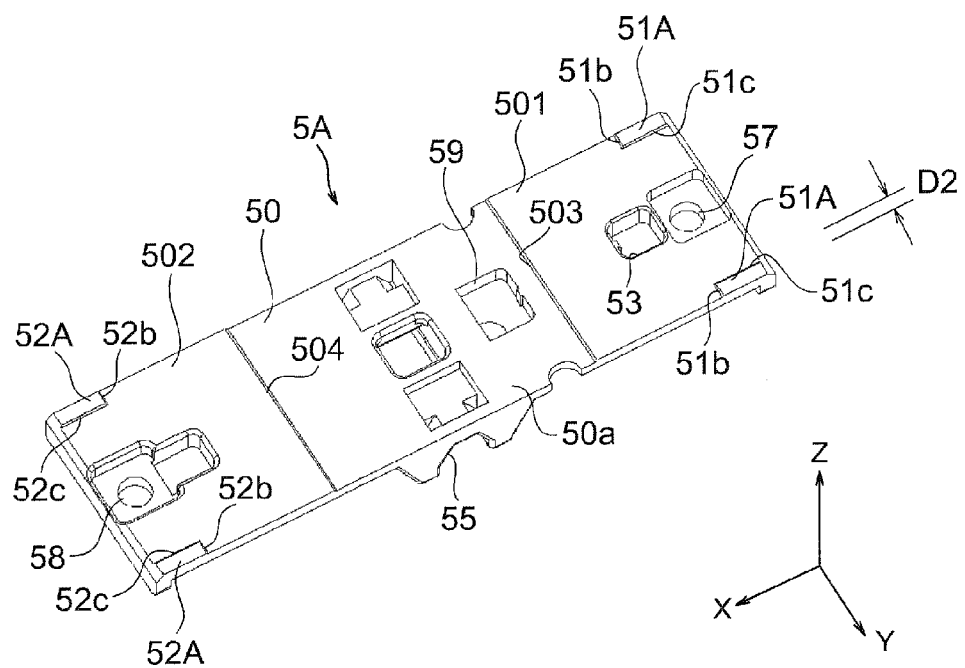
FIG. 28 is a top perspective view showing the slider according to the fourth embodiment.
Figure 29:
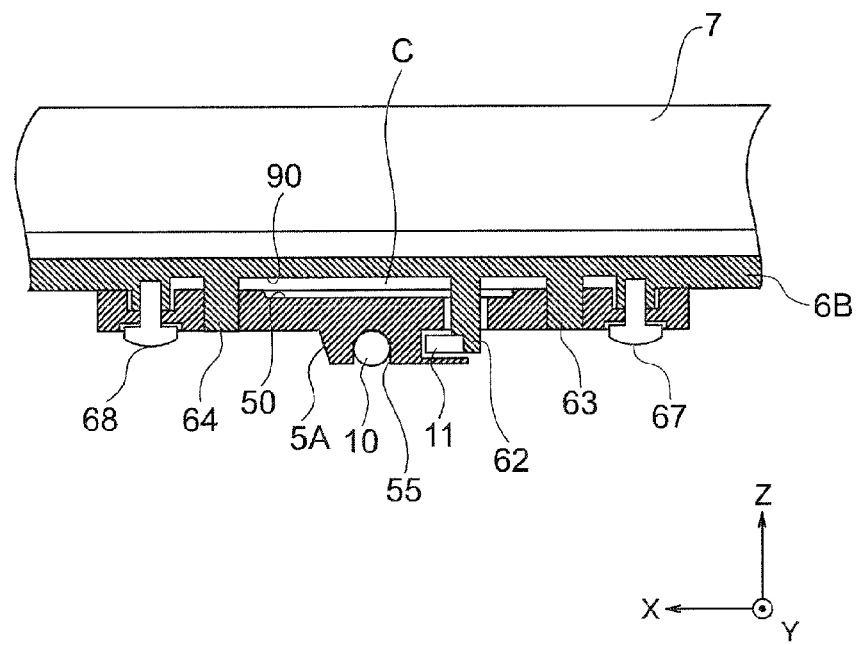
FIG. 29 is a sectional view showing the carriage and the slider according to the fourth embodiment.

FIG. 26 is a sectional view showing a carriage unit 4B (i.e., a reading unit) according to the third embodiment. FIG. 27 is a bottom perspective view showing the slider 5A and the carriage 6B of the third embodiment. FIG. 28 is a top perspective view showing the slider 5A of the third embodiment. FIG. 29 is a sectional view showing the slider 5A and the carriage 6B of the third embodiment. Components that are the same as those of the first, second or third embodiment are assigned with the same reference numerals.

As shown in FIG. 27, the carriage 6B has a concave portion 90 (i.e., a first concave) formed a side (i.e., −Z side) of the carriage 6B facing the slider 5A. The concave portion 90 faces the concave portion 50 and the contact surfaces 501 and 502 of the slider 5A. The concave portion 90 is recessed in +Z direction (i.e., in a direction away from the slider 5A), and has a bottom surface 90a (i.e., a first surface) parallel to the XY plane.

Further, contact surfaces 91 and 92 (i.e., second contact portions) are formed the side (i.e., −Z side) of the carriage 6B facing the slider 5A. The contact surfaces 91 and 92 are disposed on both end portions of the slider 5A in the X direction. The contact surfaces 91 and 92 protrude from the bottom surface 90a in −Z direction (i.e., in a direction toward the slider 5A). The bosses 65 and 66 (described in the first embodiment) of the carriage 6B are formed on the contact surfaces 91 and 92.

The contact surfaces 51A and 51B (FIG. 28) of the slider 5A contact the contact surfaces 91 and 92 of the carriage 6B. The contact surfaces 91 and 92 preferably have larger areas than the contact surfaces 51A and 51B (FIG. 28) of the slider 5A.

In this example, each of the contact surfaces 91 and 92 is elongated in the Y direction (i.e., the moving direction of the carriage unit 4B). A dimension D1 of each of the contact surfaces 91 and 92 in the Y direction is greater than a dimension D2 (FIG. 28) of each of the contact surfaces 51A and 51B in the same direction. In a particular example, the contact surfaces 91 and 92 extend substantially throughout the width (i.e., a dimension in the Y direction) of the carriage 6B.

Further, ribs 93 and 94 are formed on the side (i.e., −Z side) of the carriage 6B facing the slider 5A. The ribs 93 and 94 extend in the X direction. In a particular example, the ribs 93 and 94 extend substantially throughout the length (i.e., a dimension in the X direction) of the carriage 6B. The concave portion 90 is surrounded by the ribs 93 and 94 and the contact surfaces 91 and 92.

The slider 5A is the same as that described in the second embodiment.

As shown in FIG. 29, the gap C is formed between the bottom surface 90a of the concave 90 of the carriage 6B and the bottom surface 50a of the concave 50 and the contact surfaces 501 and 502 of the slider 5A. The gap C is formed substantially symmetrically with respect to a center of the shaft 10 in the X direction.

Other structures are the same as those of the third embodiment.

In the fourth embodiment, the gap C is provided between the slider 5A and the carriage 6B. Therefore, the vibration generated between the engaging portion 55 and the shaft 10 is less likely to be transmitted to the carriage 6B. As a result, the vibration of the CIS unit 7 can be suppressed, and accuracy of reading by the CIS unit 7 can be enhanced.

Further, in the fourth embodiment, the carriage 6B has the ribs 93 and 94 extending in the longitudinal direction of the carriage 6B (i.e., the X direction), and therefore the carriage 6B is prevented from being warped.

Furthermore, if the slider 5A is warped due to creep deformation so that the center portion of the slider 5A is raised, the contact surfaces 501 and 502 may contact the carriage 6B (more specifically, the bottom surface 60a of the concave 60 of the carriage 6B), but the bottom surface 50a of the concave 50 does not contact the carriage 6B. Therefore, it becomes possible to maintain the gap C between the slider 5A and the carriage 6B at the center portion in the X direction.

As described above, according to the fourth embodiment of the present invention, the gap C is provided between the slider 5A and the carriage 6B, and therefore the transmission of the vibration from the slider 5A to the carriage 6B can be suppressed. As a result, the vibration of the CIS unit 7 can be suppressed, and the accuracy of reading can be enhanced.

Further, since the carriage 6B has the ribs 93 and 94 extending in the longitudinal direction of the carriage 6B, the carriage 6B is prevented from being warped.

In the above fourth embodiment, the slider 5A described in the second embodiment is used in combination with the carriage 6B. However, it is also possible to use the slider 5 described in the first embodiment or the slider 5B described in the third embodiment instead of the slider 5A.

In the above described embodiments, the CIS unit 7 is used as the reading unit. However, the reading unit is not limited to the CIS unit. For example, the reading unit can be constructed by a CCD (Charge Coupling Device).

Further, in the above described embodiments, the reading apparatus (i.e., the scanner section) of the composite apparatus has been described. However, the reading apparatus can also be used in other apparatuses such as a copier. Further, the configuration of the reading apparatus is not limited to that shown in FIG. 5. It is only necessary that the reading apparatus is configured to move the reading unit back and forth.

Further, in the above description, the printer has been described as an example of the image forming apparatus. However, the present invention is applicable to a copier, a facsimile machine, a MFP (Multi-Function Peripheral) or other image forming apparatus.

What is claimed is:

1. A reading apparatus, comprising:
a reading unit; and
a movement-restriction unit that restricts a movement of the reading unit, wherein the reading unit comprises:
an image sensor for reading an image;
a carriage that holds the image sensor, the carriage having a first surface;
a slider that moves while in contact with the movement-restriction unit, the slider having a second surface facing the first surface of the carriage; and
a region, formed as a predetermined gap, positioned between the first surface of the carriage and the second surface of the slider,
wherein one of the carriage and the slider has two first contact portions that contact the other of the carriage unit and the slider, and
wherein the first contact portions are provided on both sides of the region in a longitudinal direction of the image sensor.

2. The reading apparatus according to claim 1, wherein the region is disposed between the movement-restriction unit and the carriage.

3. The reading apparatus according to claim 1, wherein a vibration damping member is provided between the first surface and the second surface in the region.

4. The reading apparatus according to claim 1, wherein the carriage has a first concave, and the slider has a second concave, and
wherein the first concave and the second concave constitute the region.

5. The reading apparatus according to claim 4, wherein the carriage includes ribs provided on both sides of the first concave in a moving direction of the reading unit, and
wherein the ribs extend in a longitudinal direction of the carriage.

6. The reading apparatus according to claim 1 wherein fitting portions for fixing the carriage and the slider to each other are provided on the first contact portions.

7. The reading apparatus according to claim 1, wherein the one of the carriage and the slider has second contact portions, and
wherein each of the second contact portions is provided between the region and a corresponding one of the contact portions is provided in a direction perpendicular to a moving direction of the reading unit.

8. The reading apparatus according to claim 7, wherein fitting portions for fixing the carriage and slider to each other are provided on the second contact portions.

9. The reading apparatus according to claim 7, wherein each of the first contact portions includes at least two parts distanced from each other in a direction parallel to a moving direction of the reading unit.

10. The reading apparatus according to claim 1, wherein the movement-restriction unit includes a shaft extending in a direction parallel to a moving direction of the reading unit, and
wherein a dimension of the region in a longitudinal direction of the image sensor is larger than an outer diameter of the shaft.

11. The reading apparatus according to claim 1, wherein a dimension of the region in a longitudinal direction of the image sensor is smaller than a half of a dimension of the image sensor in the longitudinal direction of the image sensor.

12. The reading apparatus according to claim 1, wherein the carriage is formed of a first resin, and
wherein the slider is formed of a second resin which is different from the first resin.

13. The reading apparatus according to claim 1, wherein the carriage and the slider have mutually different natural frequencies.

14. The reading apparatus according to claim 1, wherein the slider and the movement-restriction unit contact each other at a center portion in a longitudinal direction of the image sensor.

15. The reading apparatus according to claim 1, further comprising a driving member for moving the reading unit along the movement-restriction unit, and
wherein the carriage has an engaging portion that engages the driving member.

16. A composite apparatus comprising:
the reading apparatus according to claim 1.

17. The reading apparatus according to claim 1, further comprising:
a first fixing portion for fixing the slider to the carriage;
a second fixing portion for fixing the slider to the carriage, the second fixing portion being provided at a distance away from the first fixing portion in a longitudinal direction of the image sensor, and
wherein the region is located between the first fixing portion and the second fixing portion.

18. The reading apparatus according to claim 1, wherein the first fixing portion is provided on the slider, and wherein one of the first contact portions contacts a side of the carriage opposite to a side on which the carriage holds the image sensor.

19. The reading apparatus according to claim 1, wherein the slider includes a third surface;
   wherein the third surface is provided on an end portion of the region in a longitudinal direction of the image sensor;
   wherein the third surface is located between the region and one of the first contact portions; and
   wherein a distance from the carriage to the third surface is less than a distance from the carriage to the second surface.

* * * * *